United States Patent
Seta et al.

(10) Patent No.: US 6,287,705 B1
(45) Date of Patent: Sep. 11, 2001

(54) PROPYLENE RANDOM COPOLYMER, PROPYLENE RESIN COMPOSITION, FILM OF THESE, AND MULTILAYERED PROPYLENE RESIN LAMINATE

(75) Inventors: Yasushi Seta, Ichihara; Yutaka Minami, Ichiharashi, both of (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/529,418

(22) PCT Filed: Aug. 30, 1999

(86) PCT No.: PCT/JP99/04657

§ 371 Date: May 1, 2000

§ 102(e) Date: May 1, 2000

(87) PCT Pub. No.: WO00/12573

PCT Pub. Date: Mar. 9, 2000

(30) Foreign Application Priority Data

Sep. 1, 1998 (JP) .................................. 10-246850
Nov. 26, 1998 (JP) .................................. 10-335513
May 10, 1999 (JP) .................................. 11-129138
Jun. 9, 1999 (JP) .................................. 11-162905
Jun. 21, 1999 (JP) .................................. 11-173771

(51) Int. Cl.$^7$ .................................. B32B 27/08
(52) U.S. Cl. .................................. 428/500; 428/515; 428/516
(58) Field of Search .................................. 428/500, 515, 428/516; 526/348

(56) References Cited

FOREIGN PATENT DOCUMENTS

| | | |
|---|---|---|
| 2-255808 | * 10/1990 | (JP) . |
| 6-25489 | * 2/1994 | (JP) . |
| 11-35619 | * 2/1999 | (JP) . |
| 8-73530 | * 3/1999 | (JP) . |

* cited by examiner

*Primary Examiner*—Paul Thibodeau
*Assistant Examiner*—Monique Jackson
(74) *Attorney, Agent, or Firm*—Oblon, Spivak, McClelland, Maier & Neustadt, P.C.

(57) ABSTRACT

The invention provides (1) a propylene-ethylene random copolymer having specific properties, (2) a resin composition comprising a propylene-ethylene random copolymer with specific properties, and a nucleating agent, (3) a resin composition comprising a propylene-ethylene random copolymer with specific properties, and a propylene-based polymer; and their films, and multi-layered, propylene-based laminates of which the outermost layer is made of a specific propylene-based polymer. The films and the laminates exhibit excellent heat-sealability, and have good slip characteristics and good anti-blocking characteristics.

32 Claims, No Drawings

PROPYLENE RANDOM COPOLYMER, PROPYLENE RESIN COMPOSITION, FILM OF THESE, AND MULTILAYERED PROPYLENE RESIN LAMINATE

TECHNICAL FIELD

The present invention relates to propylene-based random copolymers and propylene-based resin compositions, to their films, and to multi-layered, propylene-based resin laminates. Precisely, the invention relates to propylene-based random copolymers and propylene-based resin compositions with improved moldability, and to their films and multi-layered, propylene-based resin laminates with improved physical properties for films including heat-sealability, etc.

BACKGROUND ART

As being highly tough, transparent and moisture-proof, films of crystalline propylene-based polymers are widely used for wrapping and packaging films. For their use, wrapping and packaging films are often formed into bags. In an ordinary process that comprises forming a film into bags, filling the bags with objects, and sealing the open end of the thus-filled bags, two film edges are heat-sealed by pressing them against a hot rod. In the recent process of forming film bags or wrapping or packaging objects with films, used are large-scale high-speed wrapping machines for improving the productivity. For these, it is much desired to develop materials with good heat-sealability. Wrapping and packaging films must be smoothly worked into secondary products, and are therefore desired to have good slip characteristics and anti-blocking characteristics as their indispensable properties.

However, films of propylene homopolymers are defective in that, when heat-sealed, they require high temperatures and take a lot of time. To solve this problem, a technique of copolymerizing propylene with ethylene, 1-butene and any other α-olefins is widely employed.

However, in the prior art technique of producing propylene-based polymers in the presence of a Ziegler-Natta catalyst, a large amount of comonomers including ethylene, 1-butene and other α-olefins must be copolymerized with propylene in order that the resulting copolymers could have satisfactory heat-sealability. These comonomers often remain in the copolymers, essentially forming a low-molecular-weight fraction therein, and the fraction has a low degree of crystallinity and makes the copolymers sticky (the fraction is hereinafter referred to as a sticky fraction). As a result, films of the copolymers lose the advantage of toughness that is intrinsic to polypropylene films, and, in addition, their surfaces are often blocked to detract from the secondary workability of the films. What is more, the comonomers remaining in the copolymers will often bleed out to whiten the surfaces of the copolymer films. For these reasons, the copolymers are not on the practicable level.

To solve the problem with the prior art technique, tried is dissolving the sticky fraction in an inert solvent for removing it. However, it is extremely difficult to effectively wash out the sticky fraction while the low-temperature-melting fraction that contributes to the heat-sealability of the copolymer films is prevented from being washed away along with the sticky fraction. Therefore, the method of dissolving the sticky fraction could not produce satisfactory results in industrial applications.

On the other hand, various studies are being made these days for using metallocene catalysts in production of propylene-based polymers. Polymers produced in the presence of metallocene catalysts are characterized in that they have extremely narrowed molecular weight distribution and compositional distribution. However, for ensuring molding stability of polymers and for making polymer moldings have various physical properties that will be contradictory to each other, it is said that polymers having broad molecular weight distribution and compositional distribution are rather better. Taking it into consideration, various compositions of propylene-based polymers produced in the presence of metallocene catalysts have been proposed. Until now, however, no one has succeeded in realizing a satisfactory industrial-scale method of freely producing resin polymers that have desired properties and are suitable to intended applications and molding methods.

DISCLOSURE OF THE INVENTION

Given the situation as above, we, the present inventors have made the invention, of which the object is to provide improved propylene-based random copolymers and propylene-based resin compositions, their films, and multi-layered, propylene-based resin laminates. The copolymers and resin compositions of the invention can be formed into films that exhibit excellent heat-sealability not interfering with the favorable characteristics (including good toughness, transparency, moisture-proofness, etc.) intrinsic to ordinary polypropylene films. The films of the invention have good slip characteristics and anti-blocking characteristics that are needed in high-speed working lines for forming them into bags, and even in such high-speed working lines, the quality of the films is lowered little.

Specifically, the invention includes the following first to fourth aspects.

First Aspect of the Invention

1. A propylene-based, propylene-ethylene random copolymer satisfying the following <1> to <3>:

<1> Its ethylene unit content, α (% by weight), as measured through $^{13}$C-NMR, falls between 0.2 and 10% by weight;

<2> The amount of its fraction, Wp (% by weight), eluted within the temperature range between (Tp−5)° C. and (Tp+5)° C. in temperature-programmed fractionation chromatography is at least 20% by weight, with Tp (° C.) being the peak temperature for essential elution;

<3> The amount of its fraction, W0 (% by weight), eluted within the temperature range not higher than 0° C. in temperature-programmed fractionation chromatography, and α satisfy the relationship therebetween given by the following formula (I-1):

$$W0 \leq (3+2\alpha)/4 \qquad (I\text{-}1).$$

2. The propylene-based random copolymer of above 1, of which the melting point, Tm (° C.), as measured through differential scanning calorimetry (DSC), and α satisfy the relationship therebetween given by the following formula (I-2):

$$Tm \leq 160 - 5\alpha \qquad (I\text{-}2).$$

3. The propylene-based random copolymer of above 1 or 2, of which the amount of the fraction, WH (% by weight), eluted within the temperature range not lower than (Tp+5)° C. in temperature-programmed fractionation chromatography, with Tp (° C.) being the peak temperature for essential elution, and α satisfy the relationship therebetween given by the following formula (I-3):

$$0.1 \leq WH \leq 3\alpha \quad \text{(I-3)}.$$

4. The propylene-based random copolymer of any of above 1 to 3, of which the amount of the fraction, E (% by weight), extracted with boiling diethyl ether is at most 2.5% by weight, and E and α satisfy the relationship therebetween given by the following formula (I-4):

$$E \leq (2\alpha+15)/10 \quad \text{(I-4)}.$$

5. The propylene-based random copolymer of any of above 1 to 4, of which the melt index, MI (g/10 min), falls between 0.1 and 200 g/10 min.

6. The propylene-based random copolymer of any of above 1 to 5, of which the stereospecificity index, P (mol %), as measured through $^{13}$C-NMR, is at least 98 mol %.

7. The propylene-based random copolymer of any of above 1 to 6, of which α falls between 3 and 7% by weight.

8. A film of the propylene-based random copolymer of any of above 1 to 7.

Second Aspect of the Invention

1. A propylene-based random copolymer composition comprising (i) a propylene-ethylene random copolymer and (ii) a nucleating agent, of which the peak top temperature, Tc (° C.), on the highest temperature side in its crystallization curve plotted in differential scanning calorimetry (DSC), and the peak top temperature, Tm (° C.), on the lowermost temperature side in its melting curve plotted in DSC satisfy the following formula (II-1):

$$Tc \geq 0.75 \times Tm - 5 \quad \text{(II-1)},$$

and the amount of the fraction, W0 (% by weight), eluted within the temperature range not higher than 0° C. in temperature-programmed fractionation chromatography is at most 6% by weight.

2. A propylene-based random copolymer composition comprising (i) a propylene-ethylene random copolymer and (ii) a nucleating agent, wherein the copolymer (i) satisfies the following conditions <4> to <6>:

<4> Its ethylene unit content, γ (% by weight), as measured through $^{13}$C-NMR, falls between 0.2 and 10% by weight;

<5> The amount of its fraction, Wpr (% by weight), eluted within the temperature range between (Tpr−5)° C. and (Tpr+5)° C. in temperature-programmed fractionation chromatography is at least 20% by weight, with Tpr (° C.) being the peak temperature for essential elution;

<6> The amount of its fraction, W0r (% by weight), eluted within the temperature range not higher than 0° C. in temperature-programmed fractionation chromatography, and γ satisfy the relationship therebetween given by the following formula (II-2):

$$W0r \leq (3+2\gamma)/4 \quad \text{(II-2)}.$$

3. The propylene-based random copolymer composition of above 1 or 2, wherein the amount of the component (ii) is from 0.001 to 5 parts by weight relative to 100 parts by weight of the component (i).

4. The propylene-based random copolymer composition of any of above 1 to 3, wherein the component (i) has a melt index, MI (g/10 min) of from 0.1 to 200 g/10 min.

5. The propylene-based random copolymer composition of any of above 1 to 4, wherein the component (i) has a stereospecificity index, P (mol %), as measured through $^{13}$C-NMR, of at least 98 mol %.

6. A film of the propylene-based random copolymer composition of any of above 1 to 5.

7. A multi-layered film, of which at least one layer is of the propylene-based random copolymer composition of any of above 1 to 5.

Third Aspect of the Invention

1. A propylene-based resin composition comprising (A) from 55 to 99 parts by weight of a propylene-based, propylene-ethylene random copolymer and (B) from 1 to 45 parts by weight of a propylene-based polymer of which the crystallization temperature $T_{CB}$ (° C.), as measured through differential scanning calorimetry, is higher than the crystallization temperature $T_{CA}$ (° C.) of the component (A) measured through the same; the composition being such that its peak top temperature, Tc (° C.), on the highest temperature side in its crystallization curve plotted in differential scanning calorimetry, and the peak top temperature, Tm (° C.), on the lowermost temperature side in its melting curve plotted in the same satisfy the relationship therebetween given by the following formula (III-1):

$$Tc \geq 0.75 \times Tm - 5 \quad \text{(III-1)},$$

and that the amount of its fraction, W0 (% by weight), eluted within the temperature range not higher than 0° C. in temperature-programmed fractionation chromatography (TREF) is at most 6% by weight.

2. The propylene-based resin composition of above 1, wherein the propylene-based, propylene-ethylene random copolymer of the component (A) is such that the amount of its fraction, Wp (% by weight), eluted within the temperature range between (Tp−5)° C. and (Tp+5)° C. in temperature-programmed fractionation chromatography (TREF) with Tp being the peak temperature for essential elution, satisfies the following formula (III-2):

$$20 \leq Wp \leq 65 \quad \text{(III-2)}.$$

3. The propylene-based resin composition of above 1 or 2, wherein the crystallization temperature $T_{CB}$ (° C.) of the component (B), as measured through differential scanning calorimetry, is higher by at least 10° C. than the crystallization temperature $T_{CA}$ (° C.) of the component (A) measured through the same.

4. The propylene-based resin composition of any of above 1 to 3, wherein the propylene-based, propylene-ethylene random copolymer of the component (A) copolymer satisfies the following (a'1) to (a'3):

(a'1) Its ethylene unit content, α' (% by weight), as measured through $^{13}$C-NMR, falls between 0.2 and 10% by weight;

(a'2) The amount of its fraction, Wpr (% by weight), eluted within the temperature range between (Tpr−5)° C. and (Tpr+5)° C. in temperature-programmed fractionation chromatography (TREF) is at least 20% by weight, with Tpr (° C.) being the peak temperature for essential elution; and (a'3) The amount of its fraction, W0r (% by weight), eluted within the temperature range not higher than 0° C. in temperature-programmed fractionation chromatography (TREF), and α' (% by weight) satisfy the relationship therebetween given by the following formula (III-3):

$$W0r \leq (3+2\alpha)/4 \qquad (III-3).$$

5. The propylene-based resin composition of any of above 1 to 4, wherein the component (B) satisfies the relationship given by the following formula (III-4) between its differential quantity of heat, $\Delta H_B$ (J/g), and its melting point, $Tm_B$ (° C.), on its melting curve plotted through differential scanning calorimetry:

$$\Delta H_B \geq Tm_B/2 + 10 \qquad (III-4).$$

6. A film of the propylene-based resin composition of any of above 1 to 5.

Fourth Aspect of Invention

1. A multi-layered, propylene-based resin laminate, of which at least one outermost layer comprises the following propylene-based polymer [A]:
Propylene-based Polymer [A],
which is a propylene-based, propylene-ethylene random copolymer satisfying the following <1> to <3>:
<1> Its ethylene unit content, γ, as measured through $^{13}$C-NMR, falls between 0.2 and 10% by weight;
<2> The amount of its fraction, Wp, eluted within the temperature range between (Tp–5)° C. and (Tp+5)° C. in temperature-programmed fractionation chromatography is at least 20% by weight, with Tp (° C.) being the peak temperature for essential elution;
<3> The amount of its fraction, W0 (% by weight), eluted within the temperature range not higher than 0° C. in temperature-programmed fractionation chromatography, and γ satisfy the relationship therebetween given by the following formula (A1):

$$W0 \leq (3+2\gamma)/4 \qquad (A1).$$

2. The multi-layered, propylene-based resin laminate of above 1, wherein the propylene-based polymer [A] further satisfies the following condition:
<4> that its melting point, Tm (° C.), as measured through differential scanning calorimetry (DSC), and γ satisfy the relationship therebetween given by the following formula (A2):

$$Tm \leq 160 - 5\gamma \qquad (A2).$$

3. The multi-layered, propylene-based resin laminate of above 1 or 2, wherein the propylene-based polymer [A] further satisfies the following condition:
<5> that the amount of its fraction, WH (% by weight), eluted within the temperature range not lower than (Tp+5)° C. in temperature-programmed fractionation chromatography, with Tp (° C.) being the peak temperature for essential elution, and γ satisfy the relationship therebetween given by the following formula (A3):

$$0.1 \leq WH \leq 3\gamma \qquad (A3).$$

4. The multi-layered, propylene-based resin laminate of any of above 1 to 3, wherein the propylene-based polymer [A] further satisfies the following condition:
<6> that the amount of its fraction, E, extracted with boiling diethyl ether is at most 2.5% by weight, and that E and γ satisfy the relationship therebetween given by the following formula (A4):

$$E \leq (2\gamma + 15)/10 \qquad (A4).$$

5. The multi-layered, propylene-based resin laminate of any of above 1 to 4, wherein γ of the propylene-based polymer [A] falls between 3 and 7% by weight.
6. The multi-layered, propylene-based resin laminate of any of above 1 to 5, wherein the melt index, MI, of the propylene-based polymer [A] falls between 0.1 and 200 g/10 min.
7. The multi-layered, propylene-based resin laminate of any of above 1 to 6, wherein the stereospecificity index, P, of the propylene-based polymer [A], as measured through $^{13}$C-NMR, is at least 98 mol %.
8. The multi-layered, propylene-based resin laminate of any of above 1 to 7, wherein the weight-average molecular weight, Mw, and the number-average molecular weight, Mn, of the propylene-based polymer [A], as measured through gel permeation chromatography (GPC), are in a ratio, Mw/Mn, falling between 2 and 6.
9. The multi-layered, propylene-based resin laminate of any of above 1 to 8, of which the tensile modulus, TM (MPa), and the heat-sealing temperature, HST (° C.), satisfy the following relationship therebetween:

$$TM \geq 40 \times HST - 4000 (HST \geq 115),$$

and $$TM \geq 600 (HST < 115).$$

10. The multi-layered, propylene-based resin laminate of any of above 1 to 9, wherein at least one outermost layer comprises the propylene-based polymer [A] and is laminated with at least one or more other layers each comprising the propylene-based polymer [A] that differs in the ethylene content from that in the outermost layer.
11. The multi-layered, propylene-based resin laminate of any of above 1 to 10, which is produced in a T-die casting method.

BEST MODES OF CARRYING OUT THE INVENTION

Embodiments of the first to fourth aspects of the invention are described below.

First Aspect of the Invention
1. Propylene-based Random Copolymer:
In the first aspect of the invention (this will be simply referred to as "the invention" in this section), the propylene-based random copolymer is a propylene-ethylene random copolymer that satisfies the following <1> to <3>:
<1> Its ethylene unit content, α (% by weight), as measured through $^{13}$C-NMR, falls between 0.2 and 10% by weight.
Preferably, it falls between 0.5 and 9% by weight, more preferably between 1 and 8% by weight, most preferably between 3 and 7% by weight.
If its ethylene unit content is smaller than 0.2% by weight, the copolymer could not enjoy improved heat-sealability; but if larger than 10% by weight, films of the copolymer are not good as their toughness are not on a satisfactory level.
Of the propylene-based random copolymer of the invention, the melting point, Tm (° C.), as measured through differential scanning calorimetry (DSC), and α preferably satisfy the relationship therebetween given by the following formula (I-2):

$$Tm \leq 160-5\alpha \qquad (I\text{-}2),$$

more preferably, $$Tm \leq 160-6\alpha \qquad (I\text{-}5).$$

If not, the heat-sealability of the copolymer will be poor, and the anti-blocking characteristics thereof will be also poor.

<2> Of the copolymer, the amount of the fraction, Wp (% by weight), eluted within the temperature range between (Tp−5)° C. and (Tp+5)° C. in temperature-programmed fractionation chromatography is at least 20% by weight, with Tp (° C.) being the peak temperature for essential elution, preferably, $$20 \leq Wp, \text{ and } (80-15\alpha) \leq Wp \qquad (I\text{-}6),$$

more preferably, $$30 \leq Wp, \text{ and } (90-12\alpha) \leq Wp \qquad (I\text{-}7).$$

Wp smaller than 20% by weight means that the essential elution peak appearing in the elution curve of the copolymer trails long to the higher-temperature side and/or to the lower-temperature side. The components appearing on the lower-temperature side are undesirable, as making the copolymer films sticky; and those appearing on the higher-temperature side are also undesirable, as detracting from the heat-sealability of the copolymer and increasing the dependency of the copolymer for its transparency on the molding condition.

Of the propylene-based random copolymer of the invention, the components that appear on the higher-temperature side relative to the essential elution peak of the copolymer may contribute to the moldability including the chill roll releasability of the copolymer and to the toughness of the copolymer films. Therefore, the presence of the components in some degree in the copolymer is preferred to the absence thereof. Accordingly, of the propylene-based random copolymer of the invention, the amount of the fraction, WH (% by weight), eluted within the temperature range not lower than (Tp+5)° C. in temperature-programmed fractionation chromatography, and a preferably satisfy the relationship therebetween given by the following formula (I-3):

$$0.1 \leq WH \leq 3\alpha \qquad (I\text{-}3),$$

more preferably, $$WH \leq (3\alpha - 3), \text{ and } (3\alpha - 15) \leq WH \qquad (I\text{-}8).$$

<3> Of the copolymer, the amount of the fraction, W0 (% by weight), eluted within the temperature range not higher than 0° C. in temperature-programmed fractionation chromatography, and a satisfy the relationship therebetween given by the following formula (I-1):

$$W0 \leq (3+2\alpha)/4 \qquad (I\text{-}1),$$

preferably, $$W0 \leq (2+2\alpha)/4 \qquad (I\text{-}9).$$

If W0 does not satisfy the relationship of (I-1), the copolymer films will be sticky and will be often troubled with additives and low-molecular-weight components bleeding out of their surfaces, and are therefore not good.

Of the propylene-based random copolymer of the invention, the amount of the fraction, E (% by weight), extracted with boiling diethyl ether is preferably at most 2.5% by weight, and E and α preferably satisfy the relationship therebetween given by the following formula (I-4):

$$E \leq (2\alpha+15)/10 \qquad (I\text{-}4),$$

more preferably, $$E \leq (\alpha+5)/5 \qquad (I\text{-}10).$$

Satisfying the condition as above, the copolymer films are not sticky and are therefore good.

Of the propylene-based random copolymer of the invention, the melt index, MI (g/10 min), preferably falls between 0.1 and 200 g/10 min, more preferably between 1 and 40 g/10 min, even more preferably between 2 and 20 g/10 min. If its MI oversteps the defined range, the moldability of the copolymer will be poor.

Of the propylene-based random copolymer of the invention, the stereospecificity index, P (mol %), as measured through $^{13}$C-NMR, is preferably at least 98 mol %, more preferably at least 98.5 mol %. If its stereospecificity index, P, is smaller than 98 mol %, films of the copolymer could not be tough and will have poor anti-blocking characteristics.

The data, α, Tm, Wp, WH, W0, E, MI and P of the copolymer are measured according to the methods described in the section of Examples.

2. Method for Producing Propylene-based Random Copolymer:

The propylene-based random copolymer of the invention can be produced by copolymerizing propylene and ethylene in the presence of a catalyst which comprises (A) a solid catalyst component as prepared by contacting a magnesium compound and a titanium compound with each other in the presence of an electron donor compound and optionally a silicon compound, at a temperature falling between 120° C. and 150° C., followed by washing the resulting product with an inert solvent at a temperature falling between 100° C. and 150° C., (B) an organoaluminium compound, and optionally (C) a third component of an electron donor compound.

The catalyst components, the method for preparing the catalyst, and the method for polymerizing the monomers are described hereinunder.

[1] Catalyst Components:

(A) Solid Catalyst Component:

The solid catalyst component comprises magnesium, titanium and an electron donor, and is formed from (a) a magnesium compound, (b) a titanium compound, (c) an electron donor compound, and optionally (d) a silicon compound, which are as follows:

(a) Magnesium Compound:

The magnesium compound for use in the invention is not specifically defined. Preferably used herein are magnesium compounds of a general formula (I):

$$MgR^1R^2 \qquad (I)$$

In formula (I), $R^1$ and $R^2$ each represent a hydrocarbon residue, a group of $OR^3$ (where $R^3$ represents a hydrocarbon residue), or a halogen atom. The hydrocarbon residue for $R^1$ and $R^2$ includes, for example, $C_{1-12}$ alkyl, cycloalkyl, aryl and aralkyl groups. In the group $OR^3$, $R^3$ includes, for example, $C_{1-12}$ alkyl, cycloalkyl, aryl and aralkyl groups. The halogen atom includes, for example, chlorine, bromine, iodine and fluorine atoms. $R^1$ and $R^2$ may be the same or different ones.

Specific examples of the magnesium compounds of formula (I) include alkylmagnesiums and arylmagnesiums such as dimethylmagnesium, diethylmagnesium, diisopropylmagnesium, dibutylmagnesium, dihexylmagnesium, dioctylmagnesium, ethylbutylmagnesium, diphenylmagnesium, dicyclohexylmagnesium, etc.; alkoxymagnesiums and aryloxymagnesiums such as dimethoxymagnesium, diethoxymagnesium, dipropoxymagnesium, dibutoxymagnesium, dihexyloxymagnesium, dioctoxymagnesium, diphenoxymagnesium, dicyclohexyloxymagnesium, etc.; alkylmagnesium halides and arylmagnesium halides such as ethylmagnesium chloride, butylmagnesium chloride, hexylmagnesium chloride, isopropylmagnesium chloride, isobutylmagnesium chloride, t-butylmagnesium chloride, phenylmagnesium bromide, benzylmagnesium chloride, ethylmagnesium bromide, butylmagnesium bromide, phenylmagnesium chloride, butylmagnesium iodide, etc.; alkoxymagnesium halides and aryloxymagnesium halides such as butoxymagnesium chloride, cyclohexyloxymagnesium chloride, phenoxymagnesium chloride, ethoxymagnesium bromide, butoxymagnesium bromide, ethoxymagnesium iodide, etc.; magnesium halides such as magnesium chloride, magnesium bromide, magnesium iodide, etc.

Of these magnesium compounds, preferred are magnesium halides, alkoxymagnesiums, alkylmagnesiums and alkylmagnesium halides, in view of their polymerization activity and stereospecificity.

The magnesium compounds noted above may be prepared from metal magnesium or magnesium-containing compounds.

One example of producing the magnesium compounds comprises contacting a metal magnesium with a halogen and an alcohol.

The halogen includes iodine, chlorine, bromine and fluorine. Of those, preferred is iodine. The alcohol includes, for example, methanol, ethanol, propanol, butanol, cyclohexanol, octanol, etc.

Another example of producing the magnesium compounds comprises contacting a magnesiumalkoxy compound of $Mg(OR^4)_2$ (where $R^4$ represents a hydrocarbon residue having from 1 to 20 carbon atoms) with a halide.

The halide includes, for example, silicon tetrachloride, silicon tetrabromide, tin tetrachloride, tin tetrabromide, hydrogen chloride, etc. Of those, preferred is silicon tetrachloride, in view of its polymerization activity and stereospecificity. $R^4$ includes, for example, an alkyl group such as methyl, ethyl, propyl, isopropyl, butyl, isobutyl, hexyl and octyl groups, etc.; a cyclohexyl group; an alkenyl group such as allyl, propenyl and butenyl groups, etc.; an aryl group such as phenyl, tolyl and xylyl groups, etc.; an aralkyl group such as phenethyl and 3-phenylpropyl groups, etc. Of those, especially preferred is an alkyl group having from 1 to 10 carbon atoms.

The magnesium compounds may be supported by a carrier, for example, by silica, alumina, or polystyrene.

The magnesium compounds may be used either singly or as combined. If desired, they may contain other elements such as halogens, e.g., iodine, as well as silicon, aluminium, etc., and may further contain electron donors such as alcohols, ethers, esters, etc.

(b) Titanium Compound:

The titanium compound for use in the invention is not specifically defined. Preferably used herein are titanium compounds of a general formula (II):

$$TiX^1_p(OR^5)_{4-p} \qquad (II)$$

In formula (II), $X^1$ represents a halogen atom, and is preferably a chlorine atom or a bromine atom, more preferably a chlorine atom. $R^5$ represents a hydrocarbon residue, which may be saturated or unsaturated, and may be linear, branched or cyclic. It may have hetero atoms such as sulfur, nitrogen, oxygen, silicon, phosphorus and the like. Preferably, however, $R^5$ is a hydrocarbon residue having from 1 to 10 carbon atoms, more preferably an alkyl, alkenyl, cycloalkenyl, aryl or aralkyl group, even more preferably a linear or branched alkyl group. A plurality of $(OR^5)$'s, if any, may be the same or different ones. Specific examples of $R^5$ include a methyl group, an ethyl group, an n-propyl group, an isopropyl group, an n-butyl group, a sec-butyl group, an isobutyl group, an n-pentyl group, an n-hexyl group, an n-heptyl group, an n-octyl group, an n-decyl group, an allyl group, a butenyl group, a cyclopentyl group, a cyclohexyl group, a cyclohexenyl group, a phenyl group, a tolyl group, a benzyl group, a phenethyl group, etc. p represents an integer of from 0 to 4.

Specific examples of the titanium compounds of formula (II) include tetraalkoxytitaniums such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium, tetraphenoxytitanium, etc.; titanium tetrahalides such as titanium tetrachloride, titanium tetrabromide, titanium tetraiodide, etc.; alkoxytitanium trihalides such as methoxytitanium trichloride, ethoxytitanium trichloride, propoxytitanium trichloride, n-butoxytitanium trichloride, ethoxytitanium tribromide, etc.; dialkoxytitanium dihalides such as dimethoxytitanium dichloride, diethoxytitanium dichloride, diisopropoxytitanium dichloride, di-n-propoxytitanium dichloride, diethoxytitanium dibromide, etc.; trialkoxytitanium monohalides such as trimethoxytitanium chloride, triethoxytitanium chloride, triisopropoxytitanium chloride, tri-n-propoxytitanium chloride, tri-n-butoxytitanium chloride, etc. Of those, preferred are high-halogen titanium compounds in view of their polymerization activity. Especially preferred is titanium tetrachloride. These titanium compounds may be used either singly or as combined.

(c) Electron Donor Compound:

The electron donor compound for use in the invention includes oxygen-containing electron donors, such as alcohols, phenols, ketones, aldehydes, esters of organic or inorganic acids, ethers, e.g., monoethers, diethers, polyethers, etc.; and nitrogen-containing electron donor compounds such as ammonia, amines, nitriles, isocyanates, etc. Among the organic acids, used are carboxylic acids, typically malonic acid, etc.

Of these, preferred are esters of polycarboxylic acids, and more preferred are esters of aromatic polycarboxylic acids. In view of their polymerization activity, especially preferred are monoesters and/or diesters of aromatic dicarboxylic acids. Even more preferably, the organic group in the ester segments of those esters are a linear, branched or cyclic aliphatic hydrocarbon residue.

Concretely mentioned are dialkyl esters of dicarboxylic acids of, for example, phthalic acid, naphthalene-1,2-dicarboxylic acid, naphthalene-2,3-dicarboxylic acid, 5,6,7,8-tetrahydronaphthalene-1,2-dicarboxylic acid, 5,6,7,8-tetrahydronaphthalene-2,3-dicarboxylic acid, indane-4,5-dicarboxylic acid and indane-5,6-dicarboxylic acid, in which the alkyl groups are any of methyl, ethyl, n-propyl, isopropyl, n-butyl, isobutyl, t-butyl, n-pentyl, 1-methylbutyl, 2-methylbutyl, 3-methylbutyl, 1,1-dimethylpropyl, 1-methylpentyl, 2-methylpentyl, 3-methylpentyl, 4-methylpentyl, 1-ethylbutyl, 2-ethylbutyl, n-hexyl, cyclohexyl, n-heptyl, n-octyl, n-nonyl, 2-methylhexyl, 3-methylhexyl, 4-methylhexyl, 2-ethylhexyl, 3-ethylhexyl, 4-ethylhexyl, 2-methylpentyl, 3-methylpentyl, 2-ethylpentyl and 3-ethylpentyl groups. Of these, preferred are diphthalates. Even more preferably, the organic group in the ester segments of those esters is a linear or branched aliphatic hydrocarbon residue having at least 4 carbon atoms.

As specific examples of the preferred diphthalates, mentioned are di-n-butyl phthalate, diisobutyl phthalate, di-n-heptyl phthalate, and diethyl phthalate. These compounds may be used either singly or as combined.

(d) Silicon Compound:

In preparing the solid catalyst component, an additional ingredient (d), a silicon compound of the following general formula (III) is used where necessary, in addition to the ingredients (a), (b) and (c) noted above.

wherein $R^6$ represents a hydrocarbon residue; $X^2$ represents a halogen atom; and q represents an integer of from 0 to 3.

Using the silicon compound in preparing the solid catalyst component is preferred, as it often enhances the activity and the stereospecificity of the catalyst and reduces the fine powder content of the polymer produced.

In formula (III), $X^2$ represents a halogen atom, and is preferably a chlorine or bromine atom, more preferably a chlorine atom. $R^6$ represents a hydrocarbon residue, which may be saturated or unsaturated, and may be linear, branched or cyclic. This may have hetero atoms such as sulfur, nitrogen, oxygen, silicon, phosphorus and the like. Preferably, however, $R^6$ is a hydrocarbon residue having from 1 to 10 carbon atoms, more preferably an alkyl, alkenyl, cycloalkenyl, aryl or aralkyl group. A plurality of $(OR^6)$'s, if any, may be the same or different ones. Specific examples of $R^6$ include a methyl group, an ethyl group, an n-propyl group, an isopropyl group, an n-butyl group, a sec-butyl group, an isobutyl group, an n-pentyl group, an n-hexyl group, an n-heptyl group, an n-octyl group, an n-decyl group, an allyl group, a butenyl group, a cyclopentyl group, a cyclohexyl group, a cyclohexenyl group, a phenyl group, a tolyl group, a benzyl group, a phenethyl group, etc. q represents an integer of from 0 to 3.

Specific examples of the silicon compounds of formula (III) include silicon tetrachloride, methoxytrichlorosilane, dimethoxydichlorosilane, trimethoxychlorosilane, ethoxytrichlorosilane, diethoxydichlorosilane, triethoxychlorosilane, propoxytrichlorosilane, dipropoxydichlorosilane, tripropoxychlorosilane, etc. Of those, especially preferred is silicon tetrachloride. These silicon compounds may be used either singly or as combined.

(B) Organoaluminium Compound:

The organoaluminium compound (B) for use in producing the polypropylene-based random copolymer of the invention is not specifically defined. Preferably used are organoaluminium compounds having any of alkyl groups, halogen atoms, hydrogen atoms and alkoxy groups, as well as aluminoxanes and their mixtures. Concretely mentioned are trialkylaluminiums such as trimethylaluminium, triethylaluminium, triisopropylaluminium, triisobutylaluminium, trioctylaluminium, etc.; dialkylaluminium monochlorides such as diethylaluminium monochloride, diisopropylaluminium monochloride, diisobutylaluminium monochloride, dioctylaluminium monochloride, etc.; alkylaluminium sesqui-halides such as ethylaluminium sesqui-chloride, etc.; linear aluminoxanes such as methylaluminoxane, etc. Of those organoaluminium compounds, preferred are trialkylaluminiums having $C_{1-5}$ lower alkyl groups, and especially preferred are trimethylaluminium, triethylaluminium, triisopropylaluminium and triisobutylaluminium. The organoaluminium compounds may be used either singly or as combined.

(C) Third Component (electron donor compound):

In preparing the polymerization catalyst to be used herein for producing the polypropylene-based random copolymer of the invention, optionally used is (C) an electron donor compound. The electron donor compound (C) includes organosilicon compounds with Si—O—C bonds, nitrogen-containing compounds, phosphorus-containing compounds, and oxygen-containing compounds. Of those, especially preferred are organosilicon compounds with Si—O—C bonds, and also ethers and esters, in view of their polymerization activity and stereospecificity. More preferred are organosilicon compounds with Si—O—C bonds.

Specific examples of the organosilicon compounds with Si—O—C bonds include tetramethoxysilane, tetraethoxysilane, tetrabutoxysilane, tetraisobutoxysilane, trimethylmethoxysilane, trimethylethoxysilane, triethylmethoxysilane, triethylethoxysilane, ethylisopropyldimethoxysilane, propylisopropyldimethoxysilane, diisopropyldimethoxysilane, diisobutyldimethoxysilane, isopropylisobutyldimethoxysilane, di-t-butyldimethoxysilane, t-butylmethyldimethoxysilane, t-butylethyldimethoxysilane, t-butylpropyldimethoxysilane, t-butylisopropyldimethoxysilane, t-butylbutyldimethoxysilane, t-butylisobutyldimethoxysilane, t-butyl(s-butyl) dimethoxysilane, t-butylamyldimethoxysilane, t-butylhexyldimethoxysilane, t-butylheptyldimethoxysilane, t-butyloctyldimethoxysilane, t-butylnonyldimethoxysilane, t-butyldecyldimethoxysilane, t-butyl(3,3,3-trifluoromethylpropyl)dimethoxysilane, cyclohexylmethyldimethoxysilane, cyclohexylethyldimethoxysilane, cyclohexylpropyldimethoxysilane, cyclopentyl-t-butyldimethoxysilane, cyclohexyl-t-butyldimethoxysilane, dicyclopentyldimethoxysilane, dicyclohexyldimethoxysilane, bis(2-methylcyclopentyl) dimethoxysilane, bis(2,3-dimethylcyclopentyl) dimethoxysilane, diphenyldimethoxysilane, phenyltriethoxysilane, methyltrimethoxysilane, ethyltrimethoxysilane, propyltrimethoxysilane, isopropyltrimethoxysilane, butyltrimethoxysilane, isobutyltrimethoxysilane, t-butyltrimethoxysilane, s-butyltrimethoxysilane, amyltrimethoxysilane, isoamyltrimethoxysilane, cyclopentyltrimethoxysilane, cyclohexyltrimethoxysilane, norbornyltrimethoxysilane, indenyltrimethoxysilane, 2-methylcyclopentyltrimethoxysilane, cyclopentyl(t-butoxy) dimethoxysilane, isopropyl (t-butoxy) dimethoxysilane, t-butyl(isobutoxy)dimethoxysilane, t-butyl(t-butoxy)dimethoxysilane, thexyltrimethoxysilane, thexylisopropoxydimethoxysilane, thexyl(t-butoxy) dimethoxysilane, thexylmethyldimethoxysilane, thexylethyldimethoxysilane, thexylisopropyldimethoxysilane, thexylcyclopentyldimethoxysilane, thexylmyristyldimethoxysilane, thexylcyclohexyldimethoxysilane, etc.

Also usable herein are silicon compounds of a general formula (IV):

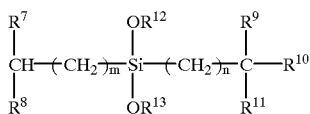

(IV)

wherein $R^7$ to $R^9$ each represent a hydrogen atom or a hydrocarbon residue, and they may be the same or different, and may be bonded to the adjacent group to form a ring; $R^{10}$ and $R^{11}$ each represent a hydrocarbon residue, and they may be the same or different, and may be bonded to the adjacent group to form a ring; $R^{12}$ and $R^{13}$ each represent an alkyl group having from 1 to 20 carbon atoms, and they may be the same or different; m represents an integer of at least 2; and n represents an integer of at least 2.

In formula (IV), concretely, $R^7$ to $R^9$ each may be a hydrogen atom; a linear hydrocarbon residue such as a methyl group, an ethyl group, an n-propyl group, etc.; a branched hydrocarbon residue such as an isopropyl group, an isobutyl group, a t-butyl group, a thexyl group, etc.; a saturated cyclic hydrocarbon residue such as a cyclobutyl group, a cyclopentyl group, a cyclohexyl group, etc.; or an unsaturated cyclic hydrocarbon residue such as a phenyl group, a pentamethylphenyl group, etc. Of those, preferred are a hydrogen atom and C1–6 linear hydrocarbon residues; and more preferred are a hydrogen atom, a methyl group, and an ethyl group.

In formula (IV), $R^{10}$ and $R^{11}$ each may be a linear hydrocarbon residue such as a methyl group, an ethyl group, an n-propyl group, etc.; a branched hydrocarbon residue such as an isopropyl group, an isobutyl group, a t-butyl group, a thexyl group, etc.; a saturated cyclic hydrocarbon residue such as a cyclobutyl group, a cyclopentyl group, a cyclohexyl group, etc.; or an unsaturated cyclic hydrocarbon residue such as a phenyl group, a pentamethylphenyl group, etc. These $R^{10}$ and $R^{11}$ may be the same or different. Of the groups concretely mentioned, preferred are C1–6 linear hydrocarbon residues; and more preferred are a methyl group and an ethyl group.

In formula (IV), $R^{12}$ and $R^{13}$ each may be a linear or branched alkyl group, such as a methyl group, an ethyl group, an n-propyl group, an isopropyl group, an n-butyl group, an isobutyl group, a sec-butyl group, a t-butyl group, an n-pentyl group, an n-hexyl group, an n-octyl group, etc. These $R^{12}$ and $R^{13}$ may be the same or different. Of the groups concretely mentioned, preferred are C1–6 linear hydrocarbon residues; and more preferred is a methyl group.

Preferred examples of the silicon compounds of formula (IV) are neopentyl-n-propyldimethoxysilane, neopentyl-n-butyldimethoxysilane, neopentyl-n-pentyldimethoxysilane, neopentyl-n-hexyldimethoxysilane, neopentyl-n-heptyldimethoxysilane, isobutyl-n-propyldimethoxysilane, isobutyl-n-butyldimethoxysilane, isobutyl-n-pentyldimethoxysilane, isobutyl-n-hexyldimethoxysilane, isobutyl-n-heptyldimethoxysilane, 2-cyclohexylpropyl-n-propyldimethoxysilane, 2-cyclohexylbutyl-n-propyldimethoxysilane, 2-cyclohexylpentyl-n-propyldimethoxysilane, 2-cyclohexylhexyl-n-propyldimethoxysilane, 2-cyclohexylheptyl-n-propyldimethoxysilane, 2-cyclopentylpropyl-n-propyldimethoxysilane, 2-cyclopentylbutyl-n-propyldimethoxysilane, 2-cyclopentylpentyl-n-propyldimethoxysilane, 2-cyclopentylhexyl-n-propyldimethoxysilane, 2-cyclopentylheptyl-n-propyldimethoxysilane, isopentyl-n-propyldimethoxysilane, isopentyl-n-butyldimethoxysilane, isopentyl-n-pentyldimethoxysilane, isopentyl-n-hexyldimethoxysilane, isopentyl-n-heptyldimethoxysilane, isopentylisobutyldimethoxysilane, isopentylneopentyldimethoxysilane, diisopentyldimethoxysilane, diisoheptyldimethoxysilane, diisohexyldimethoxysilane, etc. Of those, more preferred are neopentyl-n-propyldimethoxysilane, neopentyl-n-pentyldimethoxysilane, isopentylneopentyldimethoxysilane, diisopentyldimethoxysilane, diisoheptyldimethoxysilane, diisohexyldimethoxysilane; and even more preferred are neopentyl-n-pentyldimethoxysilane, and diisopentyldimethoxysilane.

The silicon compounds of formula (IV) may be produced by any method the producer prefers. Typical processes for producing them are mentioned below.

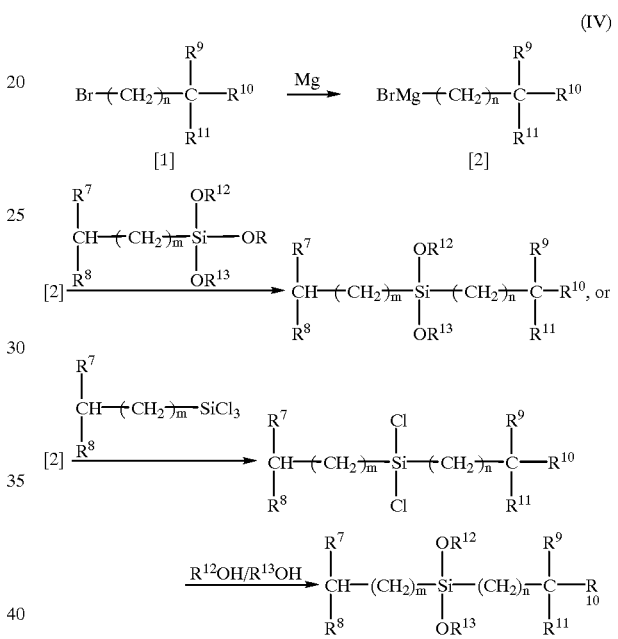

(IV)

In these processes, the starting compounds [1] are on the market, or may be prepared through known alkylation or halogenation. The compounds [1] are subjected to known Grignard reaction to obtain the organosilicon compounds of formula (IV).

The organosilicon compounds mentioned above may be used either singly or as combined.

Specific examples of the nitrogen-containing compounds include 2,6-substituted piperidines such as 2,6-diisopropylpiperidine, 2,6-diisopropyl-4-methylpiperidine, N-methyl-2,2,6,6-tetramethylpiperidine, etc.; 2,5-substituted azolidines such as 2,5-diisopropylazolidine, N-methyl-2,2,5,5-tetramethylazolidine, etc.; substituted methylenediamines such as N,N,N',N'-tetramethylmethylenediamine, N,N,N',N'-tetraethylmethylenediamine, etc.; substituted imidazolidines such as 1,3-dibenzylimidazolidine, 1,3-dibenzyl-2-phenylimidazolidine, etc.

Specific examples of the phosphorus-containing compounds include phosphites such as triethyl phosphite, tri-n-propyl phosphite, triisopropyl phosphite, tri-n-butyl phosphite, triisobutyl phosphite, diethyl-n-butyl phosphite, diethylphenyl phosphite, etc.

Specific examples of the oxygen-containing compounds include 2,6-substituted tetrahydrofurans such as 2,2,6,6- tetramethyltetrahydrofuran, 2,2,6,6-tetraethyltetrahydrofuran, etc.; dimethoxymethane derivatives such as 1,1-dimethoxy-2,3,4,5-tetrachlorocyclopentadiene, 9,9-dimethoxyfluorene, diphenyldimethoxymethane, etc.

[II] Preparation of Solid Catalyst Component:

The solid catalyst component (A) noted above may be prepared by bringing the magnesium compound (a), the titanium compound (b), the electron donor (c) and, if necessary, the silicon compound (d) into contact with each other in any known method, except for the temperature at which they are contacted with each other. The order in which they are brought into contact is not specifically defined. For example, the components may be brought into contact with each other in an inert solvent such as a hydrocarbon solvent, or they may be first diluted with an inert solvent such as a hydrocarbon solvent and then contacted with each other. The inert solvent includes, for example, aliphatic hydrocarbons and alicyclic hydrocarbons such as octane, decane, ethylcyclohexane, etc., and also their mixtures.

The amount of the titanium compound to be used may be generally from 0.5 to 100 mols, preferably from 1 to 50 mols, relative to 1 mol of magnesium of the magnesium compound. If the molar ratio of the two oversteps the defined range, the catalyst activity will be poor. The amount of the electron donor to be used may be generally from 0.01 to 10 mols, preferably from 0.05 to 1.0 mol, relative to 1 mol of magnesium of the magnesium compound. If the molar ratio of the two oversteps the defined range, the catalyst activity and stereospecificity will be poor. The amount of the silicon compound, if used, may be generally from 0.001 to 100 mols, preferably from 0.005 to 5.0 mols, relative to 1 mol of magnesium of the magnesium compound. If the molar ratio of the two oversteps the defined range, the silicon compound used will not satisfactorily realize its potentiality to improve the catalyst activity and stereospecificity. If so, in addition, the fine powder content of the polymer produced will increase.

To bring about contact between the components (a) to (d), they are all mixed and heated at a temperature falling between 120 and 150° C., preferably between 125 and 140° C. If the temperature of contact oversteps the defined range, the catalyst activity and stereospecificity will be poor. Under the conditions, they are brought into contact with each other generally for a period of from 1 minute to 24 hours, preferably from 10 minutes to 6 hours. The pressure applied during contact may vary, depending on the type of the solvent, if used, and on the contact temperature, but generally falls between 0 and 50 kg/cm$^2$G, preferably between 0 and 10 kg/cm$^2$G. During the operation for bringing them into contact with each other, it is desirable to stir the system so as to ensure uniform contact and enhance the efficiency of contact.

Also desirably, the titanium compound is contacted at least twice with the magnesium compound that serves as a catalyst carrier, to allow the magnesium compound to satisfactorily carry out its purpose.

Where a solvent is used in the contact operation, its amount may be generally at most 5000 ml, but preferably from 10 to 1000 ml, relative to one mol of the titanium compound. If the ratio oversteps the defined range, uniform contact can not be attained and the contact efficiency will be low.

The solid catalyst component produced as a result of the contact operation noted above is washed with an inert solvent at a temperature falling between 100 and 150° C., preferably between 120 and 140° C. If the washing temperature oversteps the defined range, the catalyst activity and stereospecificity could not be sufficient. The inert solvent can be, for example, aliphatic hydrocarbons such as octane, decane, etc.; alicyclic hydrocarbons such as methylcyclohexane, ethylcyclohexane, etc.; aromatic hydrocarbons such as toluene, xylene, etc.; halogenohydrocarbons such as tetrachloroethane, chlorofluorocarbons, etc.; and their mixtures. Of those, preferred are aliphatic hydrocarbons.

The washing method is not specifically defined; however, preferred is decantation or filtration. The amount of the inert solvent to be used, the washing time, and how many times the washing operation is repeated are not also specifically defined. In general, for example, the amount of the solvent to be used may fall between 100 and 100,000 ml, preferably between 1,000 and 50,000 ml, relative to 1 mol of the magnesium compound, and the washing time may fall between 1 minute and 24 hours, preferably between 10 minutes and 6 hours. If the ratio oversteps the defined range, the product could not be washed satisfactorily.

The pressure for the washing operation varies, depending on the type of the solvent used and the washing temperature, but may fall generally between 0 and 50 kg/cm$^2$G, preferably between 0 and 10 kg/cm$^2$G. During the washing operation, it is desirable to stir the system so as to ensure uniform washing and enhance the washing efficiency.

The resulting solid catalyst component may be stored in dry, or in an inert solvent such as a hydrocarbon solvent.

[III] Polymerization Method:

The amount of the catalyst to be used in producing the polypropylene-based random copolymer of the invention is not specifically defined. For example, the solid catalyst component (A) maybe used in an amount of generally from 0.00005 to 1 mmol, in terms of the titanium atom content thereof, relative to one liter of the reaction system. Regarding the amount of the component (B), organoaluminium compound to be used, the atomic ratio of aluminium/titaniummay fall generally between 1 and 1,000, but preferably between 10 and 500. If the atomic ratio oversteps the defined range, the catalyst activity will be poor. Regarding the amount of the third component (C), electron donor compound such as an organosilicon compound, if used, the molar ratio of electron donor compound (C)/organoaluminium compound (B) may fall generally between 0.001 and 5.0, but preferably between 0.01 and 2.0, more preferably between 0.05 and 1.0. If the molar ratio oversteps the defined range, the catalyst could not exhibit satisfactory activity and stereospecificity. However, if the catalyst is subjected to prepolymerization and the thus pre-treated catalyst is used, the amount of the third component (C) may be reduced to be smaller than the defined range.

In the invention, if desired, before the polymerization in the presence of the catalyst to produce the intended copolymer product, olefin prepolymerization in the presence of the same may be performed. This is for realizing high catalytic activity and high stereospecificity of the catalyst and for improving the powdery morphology of the copolymer produced. In that case, an olefin is first prepolymerized in the presence of the catalyst as prepared by mixing the solid catalyst component (A), the organic aluminium compound (B) and, if necessary, the electron donor compound (C) in a predetermined ratio, generally at a temperature falling between 1 and 100° C. under a pressure falling between ordinary pressure and 50 kg/cm$^2$G or so, and thereafter propylene is polymerized in the presence of the catalyst and the prepolymer having been formed in the previous prepolymerization step.

For the prepolymerization, preferably used are α-olefins of a general formula (V):

$$R^{14}-CH=CH_2 \qquad (V).$$

In formula (V), $R^{14}$ represents a hydrogen atom or a hydrocarbon residue. The hydrocarbon residue may be saturated or unsaturated. The olefins concretely include ethylene, propylene, 1-butene, 1-pentene, 1-hexene, 1-heptene, 1-octene, 1-decene, 3-methyl-1-pentene, 4-methyl-1-pentene, vinylcyclohexane, butadiene, isoprene, piperylene, etc. These olefins may be used either singly or as combined. Of the olefins noted above, especially preferred are ethylene and propylene.

The mode of polymerization to produce the copolymer of the invention is not specifically defined, and may be among of the following: solution polymerization, slurry polymerization, vapor-phase polymerization, bulk polymerization. Any of batch polymerization and continuous polymerization may apply to the polymerization mode, and two-stage or multi-stage polymerization under different conditions also may apply thereto.

Regarding the reaction conditions, the polymerization pressure is not specifically defined and may fall generally between atmospheric pressure and 80 kg/cm²G, but preferably between 2 and 50 kg/cm²G; and the polymerization temperature may fall generally between 0 and 200° C., but preferably between 20 and 90° C., more preferably between 40 and 90° C., in view of the polymerization efficiency. The polymerization time varies, depending on the temperature at which the starting propylene is polymerized, and therefore could not be unconditionally defined. In general, however, the polymerization time may fall between 5 minutes and 20 hours, preferably between 10 minutes and 10 hours or so.

The molecular weight of the copolymers to be produced in that manner may be controlled by adding a chain transfer agent, preferably hydrogen to the reaction system. If desired, the polymerization may be effected in the presence of an inert gas such as nitrogen or the like.

If desired, the monomers may be polymerized in two or more stages under different polymerization conditions.

Regarding the catalyst components for use in the invention, the components (A), (B) and (C) may be previously mixed in a predetermined ratio and brought into contact with each other, and, immediately after the preparation of the catalyst in that manner, propylene may be polymerized in the presence of the catalyst; or after the catalyst thus prepared has been aged for 0.2 to 3 hours or so, propylene may be polymerized in the presence of it. The catalyst components may be used after having been suspended in an inert solvent or propylene.

In the invention, the post-treatment after polymerization may be effected in any ordinary manner. For example, the powdery copolymer as produced in vapor-phase polymerization is taken out of the polymerization reactor, and a nitrogen stream may be introduced thereinto so as to remove the non-reacted olefins from the copolymer. If desired, the copolymer may be pelletized through an extruder. In this case, a small amount of water, alcohol or the like may be added to the copolymer so as to completely render the catalyst inactive. The copolymer as produced in bulk polymerization is taken out of the polymerization reactor, the non-reacted monomers are completely removed from it, and the resulting copolymer may be pelletized.

3. Films:

The films of the invention are formed from the propylene-based random copolymer mentioned above. The method for forming the films is not specifically defined, to which is applicable any ordinary sheeting mode of T-die casting. For example, powder of the propylene-based random copolymer is kneaded with optional additives, then extruded out through a kneader, granulated, and pelletized, and the resulting pellets are sheeted by T-die casting. In the T-die casting method, the propylene-based random copolymer of the invention can be sheeted into films having a thickness of from 10 to 500 μm, even under high-speed sheeting conditions at a take-up speed of 50 m/min or more. As having the good properties as above, the copolymer is favorable to a co-extrusion sheeting method of producing laminate films, in which the copolymer forms at least one layer of the laminate films produced. For sheeting the copolymer, preferred are large-size, high-performance sheeting machines for T-die casting, which, however, are not limitative. Any and every method of sheeting polymers through melt extrusion is employable for sheeting the copolymer of the invention.

Various additives are optionally added to the copolymer, including, for example, antioxidants, neutralizing agents, slip agents, anti-blocking agents, anti-frosting agents, antistatic agents, etc. One or more such additives may be added to the copolymer either singly or as combined. The antioxidants include, for example, phosphorus-containing antioxidants, phenolic antioxidants, sulfur-containing antioxidants, etc.

Specific examples of the phosphorus-containing antioxidants are trisnonylphenyl phosphite, tris(2,4-di-t-butylphenyl)phosphite, distearylpentaerythritol diphosphite, bis(2,4-di-t-butylphenyl)pentaerythritol phosphite, bis(2,6-di-t-butyl-4-methylphenyl)pentaerythritol phosphite, 2,2-methylenebis(4,6-di-t-butylphenyl)octyl phosphite, tetrakis (2,4-di-t-butylphenyl)-4,4-biphenylene-diphosphonite, Adekastab 1178 (from Asahi Denka), Sumilizer TNP (from Sumitomo Chemical), JP-135 (from Johoku Chemical), Adekastab 2112 (from Asahi Denka), JPP-2000 (from Johoku Chemical), Weston 618 (from GE), Adekastab PEP-24G (from Asahi Denka), Adekastab PEP-36 (from Asahi Denka), Adekastab HP-10 (from Asahi Denka), Sandstab P-EPQ (from Sandoz), Phosphite 168 (from Ciba Speciality Chemicals), etc.

Specific examples of the phenolic antioxidants are 2,6-di-t-butyl-4-methylphenol, n-octadecyl-3-(3',5'-di-t-butyl-4'-hydroxyphenyl)propionate, tetrakis[methylene-3-(3,5-di-t-butyl-4-hydroxyphenyl)propionate]methane, tris(3,5-di-t-butyl-4-hydroxybenzyl)isocyanurate, 4,4'-butylidenebis(3-methyl-6-t-butylphenol), triethylene glycol bis[3-(3-t-butyl-4-hydroxy-5-methylphenyl)propionate], 3,9-bis{2-[3-(3-t-butyl-4-hydroxy- 5-methyiphenyl)propionyloxy]-1,1-dimethylethyl}-2,4,8,10-tetroxaspiro[5,5]undecane, Sumilizer BHT (from Sumitomo Chemical), Yoshinox BHT (from Yoshitomi Pharmaceutical), Antage BHT (from Kawaguchi Chemical), Irganox 1076 (from Ciba Speciality Chemicals), Irganox 1010 (from Ciba Speciality Chemicals), Adekastab AO-60 (from Asahi Denka), Sumilizer BP-101 (from Sumitomo Chemical), Tominox TT (from Yoshitomi Pharmaceutical), TTHP (from Toray), Irganox 3114 (from Ciba Speciality Chemicals), Adekastab AO-20 (from Asahi Denka), Adekastab AO-40 (from Asahi Denka), Sumilizer BBM-S (from Sumitomo Chemical), Yoshinox BB (From Yoshitomi Pharmaceutical), Antage W-300 (from Kawaguchi Chemical), Irganox 245 (from Ciba Speciality Chemicals), Adekastab AO-70 (from Asahi Denka), Tominox 917 (from Yoshitomi Pharmaceutical), Adekastab AO-80 (from Asahi Denka), Sumilizer GA-80 (from Sumitomo Chemical), etc.

Specific examples of the sulfur-containing antioxidants are dilauryl 3,3'-thiodipropionate, dimyristyl-3,3'- dithiopropionate, distearyl-3,3'-thiodipropionate, pentaerythritol tetrakis(3-laurylthiopropionate), Sumilizer TPL (from Sumitomo Chemical), Yoshinox DLTP (from Yoshitomi Pharmaceutical), Antiox L (from Nihon Yushi), Sumilizer TPM (from Sumitomo Chemical), Yoshinox DMTP (from Yoshitomi Pharmaceutical), Antiox M (from Nihon Yushi), Sumilizer TPS (from Sumitomo Chemical), Yoshinox DSTP (from Yoshitomi Pharmaceutical), Antiox S (from Nihon Yushi), Adekastab AO-412S (from Asahi Denka), SEENOX 412S (from Sipro Chemical), Sumilizer TDP (from Sumitomo Chemical), etc.

Of those phenolic antioxidants, preferred are Ciba Speciality Chemicals' Irganox 1010 (chemical name: pentaerythrityl tetrakis[3-(3,5-di-t-butyl-4-hydroxyphenyl)propionate]);

Ciba Speciality Chemicals' Irganox 1076 (chemical name: octadecyl-3-(3,5-di-t-butyl-4-hydroxyphenyl)propionate);

Ciba Speciality Chemicals' Irganox 1330 (chemical name: 1,3,5-trimethyl-2,4,6-tris(3,5-di-t-butyl-4-hydroxybenzyl)benzene);

Ciba Speciality Chemicals' Irganox 3114 (chemical name: tris(3,5-di-t-butyl-4-hydroxybenzyl)isocyanurate); etc.

As the phosphorus-containing antioxidants, preferred are Ciba Speciality Chemicals' Irgafos 168 (chemical name: tris(2,4-di-t-butylphenyl) phosphite;

Ciba Speciality Chemicals' P-EPQ (chemical name: tetrakis(2,4-di-t-butylphenyl) 4,4'-biphenylene-diphosphite); etc.

The amount of the antioxidant, if added to the propylene-based random copolymer, may fall between 0.001 and 1 part by weight or so, relative to 100 parts by weight of the copolymer. With the antioxidant, the copolymer is favorably prevented from yellowing.

As the neutralizing agents, especially preferred are calcium stearate, zinc stearate, magnesium stearate, hydrotalcites (e.g., Kyowa Chemical's DHT-4A having a compositional formula of $Mg_{4.5}Al_2(OH)_{13}CO_3 \cdot 3.5H_2O$), lithium/aluminium composite hydroxides (e.g., Mizusawa Chemical's Mizukalac having a compositional formula of $[Li_2Al_4(OH)_{12}]CO_3 \cdot mH_2O$ with m≈3), etc.

As the anti-blocking agents, especially preferred are synthetic silica products, such as Fuji Silicia's synthetic silica (trade name: Saisilia), Mizusawa Chemical's synthetic silica (trade name: Mizucasil), etc.

As the slip agents, especially preferred are erucamide, oleamide, stearamide, behenamide, ethylenebisstearamide, ethylenebisoleamide, stearylercamide, oleylpalmitamide, etc.

The amount of each additive may fall between 0.001 and 1 part by weight or so, relative to 100 parts by weight of the propylene-based random copolymer. Specific examples of additive formulation are mentioned below.

Example (A) of Additive Formulation:
<1> Antioxidants,
Ciba Speciality Chemicals' Irganox 1010: 1000 ppm,
Ciba Speciality Chemicals' Irgafos 168: 1000 ppm,
<2> Neutralizing Agent,
Calcium stearate: 1000 ppm,
<3> Anti-blocking Agent,
Fuji Silicia's synthetic silica: 1000 ppm,
<4> Slip Agent,
Erucamide: 250 ppm.

Example (B) of Additive Formulation:
<1> Antioxidants,
Ciba Speciality Chemicals' Irganox 1010: 1000 ppm,
Ciba Speciality Chemicals' Irgafos 168: 1000 ppm,
<2> Neutralizing Agent,
Calcium stearate: 1000 ppm,
<3> Anti-blocking Agent,
Fuji Silicia's synthetic silica: 2300 ppm,
<4> Slip Agent,
Erucamide: 500 ppm.

Second Aspect of the Invention

The second aspect of the invention (this will be simply referred to as "the invention" in this section) is described in detail hereinunder.

The invention provides a propylene-based random copolymer comprising (i) a propylene-ethylene random copolymer and (ii) a nucleating agent, of which the peak top temperature, Tc (° C.), on the highest temperature side in its crystallization curve plotted in differential scanning calorimetry (DSC), and the peak top temperature, Tm (° C.), on the lowermost temperature side in its melting curve plotted in DSC must satisfy the following formula (II-1):

$$Tc \geq 0.75 \times Tm - 5 \qquad \text{(II-1)},$$

and the amount of the fraction, W0 (% by weight), eluted within the temperature range not higher than 0° C. in temperature-programmed fractionation chromatography must be at most 6% by weight.

In the composition, the propylene-based random copolymer (i) is a propylene-ethylene copolymer. This is because propylene homopolymers could not have satisfactory low-temperature heat-sealability. The method of producing the propylene-based random copolymer (i) will be described hereinunder.

The propylene-based random copolymer composition of the invention comprises the component (i) and a nucleating agent (ii). In this, the nucleating agent will be described hereinunder.

The propylene-based random copolymer composition of the invention must satisfy the above-mentioned formula (II-1). If not, the moldability of the composition will be poor and the properties of the films of the composition will be not good. Preferably, the composition satisfies the following formula (II-3), more preferably the following formula (II-4):

$$Tc \geq 0.75 \times Tm \qquad \text{(II-3)},$$

$$Tc \geq 0.75 \times Tm + 5 \qquad \text{(II-4)}.$$

In addition, the propylene-based random copolymer composition of the invention must be such that the amount of its fraction, W0 (% by weight), eluted within the temperature range not higher than 0° C. in temperature-programmed fractionation chromatography is at most 6% by weight. If W0 is larger than 6% by weight, films, fibers, sheets and other moldings of the composition will be sticky. If so, in addition, they will be often troubled with additives and low-molecular-weight components bleeding out of their surfaces, and are therefore not good. More preferably, W0 is at most 5% by weight, even more preferably at most 4% by weight.

The method of producing the propylene-based random copolymer (i) will be described hereinunder. The propylene-based random copolymer composition of the invention comprises the component (i) and a nucleating agent (ii). The method of producing the nucleating agent will be described hereinunder.

The invention also provides a propylene-based random copolymer composition comprising (i) a propylene-ethylene random copolymer and (ii) a nucleating agent, wherein the copolymer (i) satisfies the conditions <4> to <6> mentioned below.

This is meaningful, as being one specific embodiment of the composition mentioned above.

<4> The ethylene unit content of the copolymer, γ (% by weight), as measured through $^{13}$C-NMR, falls between 0.2 and 10% by weight.

Preferably, it falls between 0.5 and 9% by weight, more preferably between 1 and 8% by weight, most preferably between 3 and 7% by weight.

If the ethylene unit content of the copolymer is too small, the composition could not have improved heat-sealability; but if too large, films of the composition will be not tough and are therefore unfavorable.

Preferably, the propylene-based random copolymer (i) in the composition of the invention is such that its melting point, Tmr (° C.), as measured through differential scanning calorimetry (DSC), and γ satisfy the relationship therebetween given by the following formula (II-5):

$$Tmr \leq 160 - 5\gamma \tag{II-5},$$

more preferably, $$Tmr \leq 160 - 6\gamma \tag{II-6}.$$

If not, films of the composition could not have good heat-sealability and their anti-blocking characteristics will be poor.

<5> The amount of the fraction of the copolymer, Wpr (% by weight), eluted within the temperature range between (Tpr−5)° C. and (Tpr+5)° C. in temperature-programmed fractionation chromatography is at least 20% by weight, with Tpr (° C.) being the peak temperature for essential elution, preferably, $$20 \leq Wpr, \text{ and } (80 - 15\gamma) \leq Wpr \tag{II-7},$$

more preferably, $$30 \leq Wpr, \text{ and } (90 - 12\gamma) \leq Wpr \tag{II-8}.$$

Wpr smaller than 20% by weight means that the essential elution peak appearing in the elution curve of the copolymer trails long to the higher-temperature side and/or to the lower-temperature side. The components appearing on the lower-temperature side are undesirable, as making the copolymer films sticky; and those appearing on the higher-temperature side are also undesirable, as detracting from the heat-sealability of the copolymer composition and increasing the dependency of the copolymer composition for its transparency on the molding condition.

Of the propylene-based random copolymer (i) to be in the composition of the invention, the components that appear on the higher-temperature side relative to the essential elution peak of the copolymer may contribute to the moldability including the chill roll releasability of the copolymer composition and to the toughness of the copolymer films. Therefore, the presence of the components in some degree in the copolymer is preferred to the absence thereof. Accordingly, of the propylene-based random copolymer of the invention, the amount of the fraction, WHr (% by weight), eluted within the temperature range not lower than (Tp+5)° C. in temperature-programmed fractionation chromatography, and γ preferably satisfy the relationship therebetween given by the following formula (II-9):

$$0.1 \leq WHr \leq 3\gamma \tag{II-9},$$

more preferably, $$WHr \leq (3\gamma - 3), \text{ and } (3\gamma - 15) \leq WHr \tag{II-10}.$$

<6> Of the copolymer (i), the amount of the fraction, W0r (% by weight), eluted within the temperature range not higher than 0° C. in temperature-programmed fractionation chromatography, and γ satisfy the relationship therebetween given by the following formula (II-2):

$$W0r \leq (3 + 2\gamma)/4 \tag{II-2},$$

preferably, $$W0r \leq (2 + 2\gamma)/4 \tag{II-11}.$$

If W0r does not satisfy the relationship of (II-2), the copolymer films will be sticky and will be often troubled with additives and low-molecular-weight components bleeding out of their surfaces, and are therefore not good.

Of the propylene-based random copolymer (i) to be in the composition of the invention, the amount of the fraction, Er (% by weight), extracted with boiling diethyl ether is preferably at most 2.5% by weight, and Er and γ preferably satisfy the relationship therebetween given by the following formula (II-12):

$$Er \leq (2\gamma + 15)/10 \tag{II-12},$$

$$Er \leq (\gamma + 5)/5 \tag{II-13}.$$

Satisfying the condition as above, the copolymer films are not sticky and are therefore good.

Of the propylene-based random copolymer to be in the composition of the invention, the melt index, MI (g/10 min), preferably falls between 0.1 and 200 g/10 min, more preferably between 1 and 40 g/10 min, even more preferably between 2 and 20 g/10 min. If MI of the copolymer over steps the defined range, the moldability of the composition will be poor.

Of the propylene-based random copolymer to be in the composition of the invention, the stereospecificity index, P (mol %), as measured through $^{13}$C-NMR, is preferably at least 98 mol %, more preferably at least 98.5 mol %. If the stereospecificity index, P, of the copolymer is smaller than 98 mol %, films of the composition could not be tough and will have poor anti-blocking characteristics.

Also preferably, the weight-average molecular weight, Mw, and the number-average molecular weight, Mn, of the propylene-based random copolymer, as measured through gel permeation chromatography (GPC), are in a ratio, Mw/Mn, falling between 2 and 6. Containing the copolymer that satisfies the requirement, the composition is favorable as its moldability is good and its films are highly transparent. More preferably, the ratio, Mw/Mn, falls between 2.5 and 5.

The method for producing the propylene-based random copolymer to be in the composition of the invention is described below.

The propylene-based random copolymer (i) to be in the composition of the invention can be produced by copolymerizing propylene and ethylene in the presence of a catalyst which comprises (A) a solid catalyst component as prepared by contacting a magnesium compound and a titanium compound with each other in the presence of an electron donor compound and optionally a silicon compound, at a temperature falling between 120° C. and 150° C., followed by washing the resulting product with an inert solvent at a temperature falling between 100° C. and 150° C., (B) an organoaluminium compound, and optionally (C) a third component of an electron donor compound.

The catalyst components, the method for preparing the catalyst, and the method for polymerizing the monomers are mentioned below.

Catalyst Components (A) Solid Catalyst Component:

The solid catalyst component comprises magnesium, titanium and an electron donor, and is formed from (a) a magnesium compound, (b) a titanium compound, (c) an electron donor compound, and optionally (d) a silicon compound, which are as follows:

(a) Magnesium Compound:

For the details of the magnesium compound, referred to is the same as in the section of the first aspect of the invention.

(b) Titanium Compound:

For the details of the titanium compound, referred to is the same as in the section of the first aspect of the invention.

(c) Electron Donor Compound:

For the details of the electron donor compound, referred to is the same as in the section of the first aspect of the invention.

(d) Silicon Compound:

For the details of the silicon compound, referred to is the same as in the section of the first aspect of the invention.

(B) Organoaluminium Compound:

For the details of the organoaluminium compound (B) to be used in producing the polypropylene-based random copolymer for use in the invention, referred to is the same as in the section of the first aspect of the invention.

(C) Third Component (electron donor compound):

In producing the propylene-based random copolymer for use in the invention, an electron donor compound (C) may be used. For the details of the electron donor compound (C), referred to is the same as in the section of the first aspect of the invention.

Preparation of Solid Catalyst Component

The solid catalyst component (A) noted above may be prepared by bringing the magnesium compound (a), the titanium compound (b), the electron donor (c) and, if necessary, the silicon compound (d) into contact with each other in any known method, except for the temperature at which they are contacted with each other. The order in which they are brought into contact is not specifically defined. For example, the components may be brought into contact with each other in an inert solvent such as a hydrocarbon solvent, or they may be first diluted with an inert solvent such as a hydrocarbon solvent and then contacted with each other. For the details of preparing the solid catalyst component, referred to is the same as in the section of the first aspect of the invention.

Polymerization Method

The amount of the catalyst to be used in producing the propylene-based random copolymer (i) for use in the invention is not specifically defined. For example, the solid catalyst component (A) may be used in an amount of generally from 0.00005 to 1 mmol, in terms of the titanium atom content thereof, relative to one liter of the reaction system. Regarding the amount of the component (B), organoaluminium compound to be used, the atomic ratio of aluminium/titanium may fall generally between 1 and 1000, but preferably between 10 and 500. If the atomic ratio oversteps the defined range, the catalyst activity will be poor. Regarding the amount of the third component (C), electron donor compound such as an organosilicon compound, if used, the molar ratio of electron donor compound (C)/organoaluminium compound (B) may fall generally between 0.001 and 5.0, but preferably between 0.01 and 2.0, more preferably between 0.05 and 1.0. If the molar ratio oversteps the defined range, the catalyst could not exhibit satisfactory activity and stereospecificity. However, if the catalyst is subjected to prepolymerization and the thus pre-treated catalyst is used, the amount of the third component (C) may be reduced to be smaller than the defined range.

In the invention, if desired, before the polymerization in the presence of the catalyst to produce the propylene-based random copolymer (i), olefin prepolymerization in the presence of the same may be performed. This is for realizing high catalytic activity and high stereospecificity of the catalyst and for improving the powdery morphology of the copolymer produced. In that case, an olefin is first prepolymerized in the presence of the catalyst as prepared by mixing the solid catalyst component (A), the organic aluminium compound (B) and, if necessary, the electron donor compound (C) in a predetermined ratio, generally at a temperature falling between 1 and 100° C. under a pressure falling between ordinary pressure and 50 kg/cm$^2$G or so, and thereafter propylene is copolymerized with a comonomer, ethylene, in the presence of the catalyst and the prepolymer having been formed in the previous prepolymerization step.

For the details of olefins for prepolymerization, referred to is the same as in the section of the first aspect of the invention.

The mode of polymerization to produce the copolymer for use in the invention is not specifically defined, and may be among of the following: solution polymerization, slurry polymerization, vapor-phase polymerization, bulk polymerization. Any of batch polymerization and continuous polymerization may apply to the polymerization mode, and two-stage or multi-stage polymerization under different conditions also may apply thereto.

Regarding the reaction conditions, the polymerization pressure is not specifically defined and may fall generally between atmospheric pressure and 80 kg/cm$^2$G, but preferably between 2 and 50 kg/cm$^2$G; and the polymerization temperature may fall generally between 0 and 200° C., but preferably between 20 and 90° C., more preferably between 40 and 90° C., in view of the polymerization efficiency. The polymerization time varies, depending on the temperature at which the starting propylene and ethylene are polymerized, and therefore could not be unconditionally defined. In general, however, the polymerization time may fall between 5 minutes and 20 hours, preferably between 10 minutes and 10 hours or so. The blend ratio of the starting monomers varies, depending on the polymerization temperature and pressure, and therefore could not be unconditionally defined. In general, however, the ethylene fraction may fall between 0.1 and 20 mol %, with the balance of propylene. The molecular weight of the copolymers to be produced in that manner may be controlled by adding a chain transfer agent, preferably hydrogen to the reaction system. If desired, the polymerization may be effected in the presence of an inert gas such as nitrogen or the like.

If desired, the monomers may be polymerized in two or more stages under different polymerization conditions.

Regarding the catalyst components for use in the invention to produce the propylene-based random copolymer (i), the components (A), (B) and (C) may be previously mixed in a predetermined ratio and brought into contact with each other, and, immediately after the preparation of the catalyst in that manner, propylene and ethylene may be polymerized in the presence of the catalyst; or after the catalyst thus prepared has been aged for 0.2 to 3 hours or so, propylene and ethylene may be polymerized in the presence of it. The catalyst components may be used after having been suspended in an inert solvent or propylene.

In the invention, the propylene-based random copolymer (i) having been prepared through polymerization in the manner as above may be subjected to post-treatment in any ordinary manner. For example, the powdery copolymer as produced in vapor-phase polymerization is taken out of the polymerization reactor, and a nitrogen stream may be introduced thereinto so as to remove the non-reacted olefins from the copolymer. If desired, the copolymer may be pelletized through an extruder. In this case, a small amount of water, alcohol or the like may be added to the copolymer so as to completely render the catalyst inactive. The copolymer as produced in bulk polymerization is taken out of the polymerization reactor, the non-reacted monomers are completely removed from it, and the resulting copolymer may be pelletized.

Next described is the nucleating agent (ii) to be combined with the propylene-based random copolymer (i).
Component (ii)

The nucleating agent (ii) is not specifically defined. Preferably, it is selected from organic phosphoric acid-type nucleating agents, sorbitol-type nucleating agents, aromatic carboxylic acid-type nucleating agents, high-melting-point polymer-type nucleating agents, inorganic nucleating agents, resin acid-type nucleating agents, amide-type nucleating agents. These are described in order.
Organic Phosphoric Acid-type Nucleating Agents As the organic phosphoric acid-type nucleating agents, for example, mentioned are compounds of a general formula (VI):

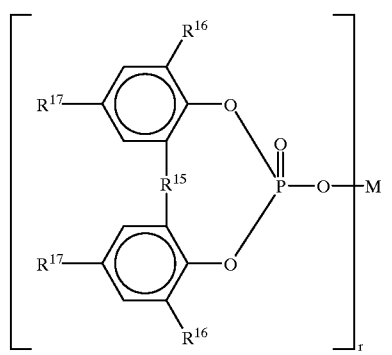

(VI)

wherein $R^{15}$ represents an oxygen or sulfur atom, or a hydrocarbon residue having from 1 to 10 carbon atoms; $R^{16}$ and $R^{17}$ each represent a hydrogen atom, or a hydrocarbon residue having from 1 to 10 carbon atoms; $R^{16}$ and $R^{17}$ may be the same or different; $R^{16}$'s, or $R^{17}$'s, or $R^{16}$ and $R^{17}$ may be bonded to each other to form a cyclic structure; M represents a mono- to tri-valent metal atom; and r indicates an integer of from 1 to 3.

Specific examples of the compounds of formula (VI) are sodium-2,2'-methylene-bis(4,6-di-t-butylphenyl)phosphate, sodium-2,2'-ethylidene-bis(4,6-di-t-butylphenyl)phosphate, lithium-2,2'-methylene-bis-(4,6-di-t-butylphenyl) phosphate, lithium-2,2'-ethylidene-bis(4,6-di-t-butylphenyl) phosphate, sodium-2,2'-ethylidene-bis(4-i-propyl-6-t-butylphenyl)phosphate, lithium-2,2'-methylene-bis(4-methyl-6-t-butylphenyl)phosphate, lithium-2,2'-methylene-bis(4-ethyl-6-t-butylphenyl)phosphate, calcium-bis[2,2'-thiobis(4-methyl-6-t-butylphenyl)phosphate], calcium-bis[2,2'-thiobis(4-ethyl-6-t-butylphenyl)phosphate], calcium bis[2,2'-thiobis-(4,6-di-t-butylphenyl)phosphate], magnesium-bis[2,2'-thiobis(4,6-di-t-butylphenyl) phosphate], magnesium-bis[2,2'-thiobis-(4-t-octylphenyl) phosphate], sodium-2,2'-butylidene-bis(4,6-dimethylphenyl)phosphate, sodium-2,2'-butylidene-bis(4,6-di-t-butylphenyl)phosphate, sodium-2,2'-t-octylmethylene-bis(4,6-di-methylphenyl)phosphate, sodium-2,2'-t-octylmethylene-bis(4,6-di-t-butylphenyl)phosphate, calcium-bis(2,2'-methylene-bis(4,6-di-t-butylphenyl) phosphate, magnesium-bis[2,2'-methylene-bis(4,6-di-t-butylphenyl)phosphate], barium-bis[2,2'-methylene-bis(4,6-di-t-butylphenyl)phosphate], sodium-2,2'-methylene-bis(4-methyl-6-t-butylphenyl)phosphate, sodium-2,2'-methylene-bis(4-ethyl-6-t-butylphenyl)phosphate, sodium (4,4'-dimethyl-5,6'-di-t-butyl-2,2'-biphenyl)phosphate, calcium-bis[(4,4'-dimethyl-6,6'-di-t-butyl-2,2'-biphenyl)phosphate], sodium-2,2'-ethylidene-bis(4-n-butyl-6-t-butylphenyl) phosphate, sodium-2,2'-methylene-bis(4,6-di-methylphenyl)phosphate, sodium-2,2'-methylene-bis(4,6-di-ethylphenyl)phosphate, potassium-2,2'-ethylidene-bis(4,6-di-t-butylphenyl)phosphate, calcium-bis[2,2'-ethylidene-bis(4,6-di-t-butylphenyl)phosphate), magnesium-bis[2,2'-ethylidene-bis(4,6-di-t-butylphenyl)phosphate], barium-bis[2,2'-ethylidene-bis(4,6-di-t-butylphenyl)phosphate], aluminium-tris[2,2'-methylene-bis(4,6-di-t-butylphenyl) phosphate], aluminium-tris[2,2'-ethylidene-bis(4,6-di-t-butylphenyl)phosphate], bis(2,4,8,10-tetra-t-butyl-6-hydroxy-12H-dibenzo[d,g][1,3,2]dioxophosphosin-6-oxide) ammonium hydroxide, and mixtures of two or more of them. Especially preferred are sodium-2,2'-methylene-bis (4,6-di-t-butylphenyl)phosphate, and bis(2,4,8,10-tetra-t-butyl-6-hydroxy-12H-dibenzo[d,g](1,3,2]dioxophosphosin-6-oxide)ammonium hydroxide.

As the organic phosphoric acid-type nucleating agents, also mentioned are compounds of a general formula (VII):

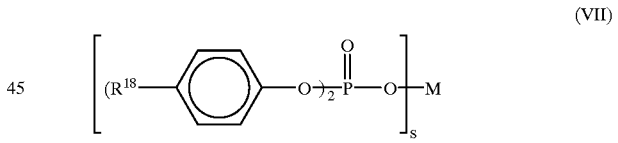

(VII)

wherein $R^{18}$ represents a hydrogen atom, or a hydrocarbon residue having from 1 to 10 carbon atoms; M represents a mono- to tri-valent metal atom; and s indicates an integer of from 1 to 3.

Specific examples of the compounds of formula (VII) are sodium-bis(4-t-butylphenyl)phosphate, sodium-bis(4-methylphenyl)phosphate, sodium-bis(4-ethylphenyl) phosphate, sodium-bis(4-i-propylphenyl)phosphate, sodium-bis(4-t-octylphenyl)phosphate, potassium-bis(4-t-butylphenyl)phosphate, calcium-bis(4-t-butylphenyl) phosphate, magnesium-bis(4-t-butylphenyl)phosphate, lithium-bis(4-t-butylphenyl)phosphate, aluminium-bis(4-t-butylphenyl)phosphate, and mixtures of two or more of them. Especially preferred is sodium-bis(4-t-butylphenyl) phosphate.
Sorbitol-type Nucleating Agents As the sorbitol-type nucleating agents, for example, mentioned are compounds of a general formula (VIII):

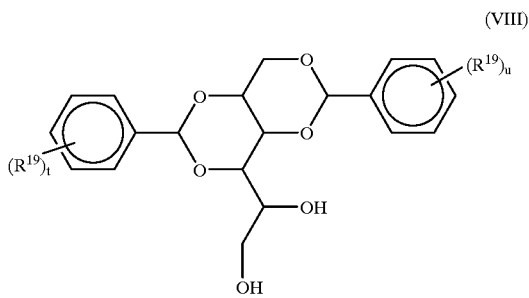

(VIII)

wherein $R^{19}$'s may be the same or different, and each represents a hydrogen atom, a halogen atom such as chlorine, or a hydrocarbon residue having from 1 to 10 carbon atoms; and t and u each indicate an integer of from 0 to 5.

Specific examples of the compounds of formula (VIII) are 1,3,2,4-dibenzylidenesorbitol, 1,3-dibenzylidene-2,4-p-methylbenzylidenesorbitol, 1,3-benzylidene-2,4-p-ethylbenzylidenesorbitol, 1,3-p-methylbenzylidene-2,4-benzylidenesorbitol, 1,3-p-ethylbenzylidene-2,4-benzylidenesorbitol, 1,3-p-methylbenzylidene-2,4-p-ethylbenzylidenesorbitol, 1,3-p-ethylbenzylidene-2,4-p-methylbenzylidenesorbitol, 1,3,2,4-di(p-methylbenzylidene)sorbitol, 1,3,2,4-di(p-ethylbenzylidene)sorbitol, 1,3,2,4-di(p-n-propylbenzylidene)sorbitol, 1,3,2,4-di(p-i-propylbenzylidene)sorbitol, 1,3,2,4-di(p-n-butylbenzylidene)sorbitol, 1,3,2,4-di(p-s-butylbenzylidene)sorbitol, 1,3,2,4-di(p-t-butylbenzylidene)sorbitol, 1,3,2,4-di(2',4'-dimethylbenzylidene)sorbitol, 1,3,2,4-di(p-methoxybenzylidene)sorbitol, 1,3,2,4-di(p-ethoxybenzylidene)sorbitol, 1,3-benzylidene-2,4-p-chlorobenzylidenesorbitol, 1,3-p-chlorobenzylidene-2,4-benzylidenesorbitol, 1,3-p-chlorobenzylidene-2,4-p-methylbenzylidenesorbitol, 1,3-p-chlorobenzylidene-2,4-p-ethylbenzylidenesorbitol, 1,3-p-methylbenzylidene-2,4-p-chlorobenzylidenesorbitol, 1,3-p-ethylbenzylidene-2,4-p-chlorobenzylidenesorbitol, 1,3,2,4-di(p-chlorobenzylidene)sorbitol, and mixtures of two or more of them. Especially preferred are 1,3,2,4-dibenzylidenesorbitol, 1,3,2,4-di(p-methylbenzylidene)sorbitol, 1,3,2,4-di(p-ethylbenzylidene)sorbitol, 1,3-p-chlorobenzylidene-2,4-p-methylbenzylidenesorbitol, 1,3,2,4-di(p-chlorobenzylidene)sorbitol, and mixtures of two or more of them.

As the sorbitol-type nucleating agents, also mentioned are compounds of a general formula (IX):

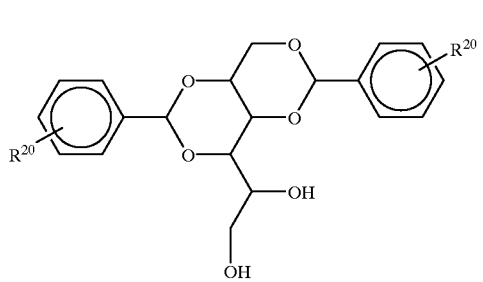

(IX)

wherein $R^{20}$'s may be the same or different, each representing an alkyl group having 1 or 2 carbon atoms.

Aromatic Carboxylic Acid-type Nucleating Agents

As the aromatic carboxylic acid-type nucleating agents, mentioned is hydroxyaluminium di-p-t-butylbenzoate of a formula (X):

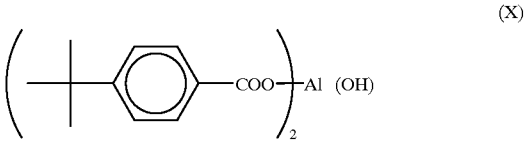

(X)

High-boiling-point Polymer-type Nucleating Agents

As the high-boiling-point polymer-type nucleating agents, mentioned are polyvinylcycloalkanes such as polyvinylcyclohexane, polyvinylcyclopentane, etc.; and poly-3-methylpentene-1, poly-3-methylbutene-1, polyalkenylsilanes, etc.

Inorganic Nucleating Agents

As the inorganic nucleating agents, mentioned are silica, diatomaceous earth, alumina, titanium oxide, magnesium oxide, pumice powder, pumice balloons, aluminium hydroxide, magnesium hydroxide, basic magnesium carbonate, dolomite, calcium sulfate, potassium titanate, barium sulfate, calcium sulfite, talc, clay, mica, asbestos, glass fibers, glass flakes, glass beads, calcium silicate, montmorillonite, bentonite, graphite, aluminium powder, molybdenum sulfide, etc. Especially preferred is talc.

Rosin Acid-type Nucleating Agents

As the rosin acid-type nucleating agents, for example, used are metal salts of rosin acid, such as sodium salts of rosin acid, potassium salts of rosin acid, magnesium salts of rosin acid, etc.

The metal salts of rosin acid are reaction products of rosin acid and metal compounds, including mixtures of metal salts of rosin acid and non-reacted rosin acid, and metal salts of rosin acid not containing non-reacted rosin acid.

The metal compounds capable of reacting with rosin acid to form metal salts of the acid are compound having a metal element such as sodium, potassium, magnesium or the like and capable of forming salts with rosin acid. Concretely, they include chlorides, nitrates, acetates, sulfates, carbonates, oxides and hydroxides of metals such as those mentioned above.

Rosin acids are found in natural rosins such as gum rosin, tall oil rosin, wood rosin, etc.; various modified rosins such as non-homogenized rosin, hydrogenated rosin, dehydrogenated rosin, rosin polymers, α,β-ethylenic unsaturated carboxylic acid-modified rosins, etc.; purified products of natural rosins such as those mentioned above; purified products of the modified rosins such as those mentioned above.

In general, natural rosins contain plural sorts of rosin acids, such as pimaric acid, sandarachpimaric acid, parastric acid, isopimaric acid, abietic acid, dehydroabietic acid, neoabietic acid, dihydropimaric acid, dihydroabietic acid, tetrahydroabietic acid, etc.

The unsaturated carboxylic acids to be used for preparing the α,β-ethylenic unsaturated carboxylic acid-modified rosins include, for example, maleic acid, maleic anhydride, fumaric acid, itaconic acid, itaconic anhydride, citraconic acid, acrylic acid, methacrylic acid, etc.

Preferred examples of metal salts of rosin acid for use in the invention are compounds of general formulae (XIa) and (XIb):

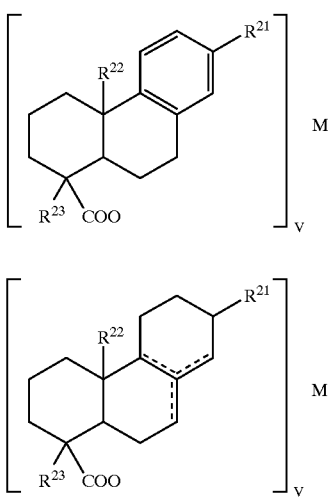

wherein $R^{21}$, $R^{22}$ and $R^{23}$ may be the same or different, each representing a hydrogen atom, an alkyl group, a cycloalkyl group, or an aryl group; M represents a mono- to tri-valent metal ion; v is an integer of from 1 to 3, indicating the valency of the metal ion M.

Concretely, the alkyl group for $R^{21}$ to $R^{23}$ may have from 1 to 8 carbon atoms, including a methyl group, an ethyl group, an n-propyl group, an isopropyl group, an n-butyl group, an isobutyl group, a t-butyl group, all types of pentyl groups, all types of heptyl groups, all types of octyl groups, etc. The alkyl group may have substituents of hydroxyl groups, carboxyl groups, alkoxy groups, halogens, etc.

The cycloalkyl group for $R^{21}$ to $R^{23}$ may have from 5 to 8 carbon atoms, including a cyclopentyl group, a cyclohexyl group, a cycloheptyl group, etc. The cycloalkyl group may have substituents of hydroxyl groups, carboxyl groups, alkoxy groups, halogens, etc.

The aryl group for $R^{21}$ to $R^{23}$ may have from 6 to 10 carbon atoms, including a phenyl group, a tolyl group, a naphthyl group, etc. The aryl group may have substituents of hydroxyl groups, carboxyl groups, alkoxy groups, halogens, etc.

Of the compounds with $R^{21}$ to $R^{23}$ as above, preferred are those with $R^{21}$ of an isopropyl group, and $R^{22}$ and $R^{23}$ of methyl groups.

M is a mono- to tri-valent metal ion, concretely including monovalent metal ions of lithium, sodium, potassium, rubidium, cesium, etc.; divalent metal ions of beryllium, magnesium, calcium, strontium, barium, zinc, etc.; and trivalent metal ions such as aluminium, etc. Preferred are mono- or di-valent metal ions, and more preferred are sodium, potassium and magnesium ions.

Specific examples of the compounds (XIa) are metal salts of dehydroabietic acid, such as lithium dehydroabietate, sodium dehydroabietate, potassium dehydroabietate, beryllium dehydroabietate, magnesium dehydroabietate, calcium dehydroabietate, zinc dehydroabietate, aluminium dehydroabietate, etc. Preferred are sodium dehydroabietate, potassium dehydroabietate, and magnesium dehydroabietate.

Specific examples of the compounds (XIb) are metal salts of dihydroabietic acid, such as lithium dihydroabietate, sodium dihydroabietate, potassium dihydroabietate, beryllium dihydroabietate, magnesium dihydroabietate, calcium dihydroabietate, zinc dihydroabietate, aluminium dihydroabietate, etc. Preferred are sodium dihydroabietate, potassium dihydroabietate, and magnesium dihydroabietate.

Amide-type Nucleating Agents

Herein usable are urea derivatives such as those described in Japanese Patent Laid-Open Nos. 240058/1994 and 256590/1994; dicarboxylic acid amide compounds such as those described in Japanese Patent Laid-Open No. 262936/1993; tricarballylic acid amide compounds such as those described in Japanese Patent Laid-Open No. 278374/1995; and sulfur-containing amides such as those described in Japanese Patent Publication No. 34568/1992.

As the component (ii), one or more of the compounds mentioned above may be used either singly or as combined.

Containing the nucleating agent, the composition can be sheeted into films in high-speed sheeting lines, in which the films formed have good properties.

The amount of the component (ii) to be in the composition falls preferably between 0.001 and 5 parts by weight, more preferably between 0.001 and 1 part by weight, even more preferably between 0.005 and 0.5 parts by weight. If its amount is too small, the component (ii) could not exhibit its effect to the intended degree; but even if larger than the defined range, the composition could not enjoy the effect of the increased amount of the component (ii).

Depending on its use, the propylene-based random copolymer composition of the invention may optionally contain any other additives, such as antioxidants, neutralizing agents, anti-blocking agents, slip agents, etc., in addition to the component (ii).

Preferred examples of the antioxidants for use herein are phenolic antioxidants such as pentaerythritol tetrakis[3-(3,5-di-t-butyl-4-hydroxyphenyl)propionate] (Irganox 1010 from Ciba Speciality Chemicals), octadecyl 3-(3,5-di-t-butyl-4-hydroxyphenyl)propionate (Irganox 1076 from Ciba Speciality Chemicals), 1,3,5-trimethyl- 2,4,6-tris(3,5-di-t-butyl-4-hydroxybenzyl)benzene (Irganox 1330 from Ciba Speciality Chemicals), tris(3,5-di-t-butyl-4-hydroxybenzyl) isocyanurate (Irganox 3114 from Ciba Speciality Chemicals), etc.; and phosphorus-containing antioxidants such as tris(2,4-di-t-butylphenyl)phosphite (Irgafos 168 from Ciba Speciality Chemicals), tetrakis(2,4-di-t-butylphenyl) 4,4'-biphenylene-diphosphite (P-EPQ from Ciba Speciality Chemicals), etc.

Preferred examples of the neutralizing agents for use herein are calcium stearate, zinc stearate, magnesium stearate; hydrotalcites such as $Mg_{4.5}Al_2(OH)_{13}CO_3 \cdot 3.5H_2O$ (DHT-4A from Kyowa Chemical), etc.; and lithium/aluminium composite hydroxides such as $Li_2Al_4(OH)_{12}]CO_3 \cdot 3H_2O$ (Mizukalac from Mizusawa Chemical), etc.

Preferred examples of the anti-blocking agents for use herein are synthetic silica compounds such as Sailicia (from Fuji Silicia), Mizucasil (from Mizusawa Chemical), etc.

Preferred examples of the slip agents for use herein are fatty acid amides such as erucamide, oleamide, stearamide, behenamide, ethylenebisstearamide, ethylenebisoleamide, stearylercamide, oleylpalmitamide, etc.

The propylene-based random copolymer composition of the invention may contain any known additives such as antistatic agents, anti-frosting agents, weather-proofing agents, colorants, anti-dripping agents, flame retardants, flame retardation promoters, antimicrobial agents, inorganic or organic fillers, etc.

The propylene-based random copolymer may be sheeted into films. The method for sheeting the copolymer into films is not specifically defined, to which is applicable any ordinary sheeting mode of T-die casting. For example, powder of the propylene-based random copolymer is kneaded with the additive component along with optional additives, extruded out through a kneader, granulated, and pelletized, and the resulting pellets are sheeted by T-die casting. In the T-die casting method, the propylene-based random copolymer composition of the invention can be sheeted into films having a thickness of from 10 to 500 µm, even under high-speed sheeting conditions at a take-up speed of 50 m/min or more. As having the good properties as above, the copolymer composition is favorable to a co-extrusion sheeting method of producing laminate films, in which the copolymer composition forms at least one layer of the laminate films produced. For sheeting the copolymer composition, preferred are large-size, high-performance sheeting machines for T-die casting, which, however, are not limitative. Any and every method of sheeting polymers through melt extrusion is employable for sheeting the copolymer composition of the invention.

Third Aspect of the Invention

The third aspect of the invention (this will be simply referred to as "the invention" in this section) is described in detail hereinunder.

[1] The propylene-based resin composition of the invention comprises (A) from 55 to 99 parts by weight, preferably from 65 to 98.5 parts by weight, more preferably from 75 to 98 parts by weight of a propylene-based, propylene-ethylene random copolymer, which is preferably such that the amount of its fraction, Wp (% by weight), eluted within the temperature range between (Tp−5)° C. and (Tp+5)° C. in temperature-programmed fractionation chromatography (TREF) with Tp (° C.) being the peak temperature for essential elution, satisfies the following formula (III-2):

$$20 \leq Wp \leq 65 \tag{III-2},$$

and (B) from 1 to 45 parts by weight, preferably from 1.5 to 35 parts by weight, more preferably from 2 to 25 parts by weight of a propylene-based polymer of which the crystallization temperature TCB (° C.) as measured through differential scanning calorimetry is higher preferably by at least 10° C., more preferably by at least 20° C., even more preferably by at least 30° C. than the crystallization temperature $T_{CA}$ (° C.), as measured through the same, of the component (A), more preferably the propylene-based polymer that further satisfies the relationship given by the following formula (III-4) between its differential quantity of heat, $\Delta H_B$ (J/g), and its melting point, $Tm_B$ (° C.), on its melting curve plotted through differential scanning calorimetry:

$$\Delta H_B \geq Tm_B/2+10 \tag{III-4},$$

the composition being such that its peak top temperature, Tc (° C.), on the highest temperature side in its crystallization curve plotted in differential scanning calorimetry, and the peak top temperature, Tm (° C.), on the lowermost temperature side in its melting curve plotted in the same satisfy the relationship therebetween given by the following formula (III-1):

$$Tc \geq 0.75 \times Tm-5 \tag{III-1},$$

preferably, $$Tc \geq 0.75 \times Tm \tag{III-1-2},$$

more preferably, $$Tc \geq 0.75 \times Tm+5 \tag{III-1-3},$$

and that the amount of its fraction, W0 (% by weight), eluted within the temperature range not higher than 0° C. in temperature-programmed fractionation chromatography (TREF) is at most 6% by weight, preferably at most 5% by weight, more preferably at most 4% by weight.

Of the propylene-based, propylene-ethylene random copolymer of the component (A), the polymer characteristics including the comonomer content and the overall melt index, and also the type of the polymerization catalyst to be used for preparing the copolymer, and the polymerization method to give the copolymer are not specifically defined. In the following section [2], however, the copolymer of the component (A) is specifically defined with respect to these parameters. Preferably, the propylene-based random copolymer is such that the amount of its fraction, Wp (% by weight), eluted within the temperature range between (Tp−5)° C. and (Tp+5)° C. in temperature-programmed fractionation chromatography (TREF) with Tp (° C.) being the peak temperature for essential elution, satisfies the following formula (III-2):

$$20 \leq Wp \leq 65 \tag{III-2},$$

more preferably, $$20 \leq Wp \leq 60 \tag{III-2-2},$$

even more preferably, the copolymer satisfies, in addition to the requirement given by formula (III-2-2), the following relational formula (III-2-3):

$$80-15\alpha \leq Wp \tag{III-2-3},$$

wherein α indicates the comonomer (ethylene) content (% by weight) of the copolymer, still preferably satisfying both the following formulae (III-2-4) and (III-2-5):

$$20 \leq Wp \leq 60 \tag{III-2-4},$$

$$90-12\alpha \leq Wp \leq 105-7.5\alpha \tag{III-2-5}.$$

The method of temperature-programmed fractionation chromatography (TREF) is described in the section of Examples.

The propylene-based polymer of the component (B) shall be such that its crystallization temperature $T_{CB}$ (° C.) as measured through differential scanning calorimetry is higher than the crystallization temperature $T_{CA}$ (° C.), as measured through the same, of the component (A). Accordingly, it includes propylene homopolymers, propylene-ethylene block copolymers, propylene-α-olefin copolymers, etc. If the crystallization temperature $T_{CB}$ (° C.) of the component (B) is not higher than the crystallization temperature $T_{CA}$ (° C.) of the component (A), the moldability of the composition is not good and the properties of the films of the composition are also not good.

Further preferably, the propylene-based polymer satisfies the relationship given by the following formula (III-4) between its differential quantity of heat, $\Delta H_B$ (J/g) and its melting point, $Tm_B$ (° C.), on its melting curve plotted through differential scanning calorimetry:

$$\Delta H_B \geq Tm_B/2+10 \tag{III-4},$$

more preferably, $$\Delta H_B \geq Tm_B/2+15 \tag{III-4-2}.$$

The propylene-based polymer satisfying the relationship given by formula (III-4) has a high degree of crystallinity, though its melting point is relatively low. The methods for measuring the crystallization temperature, the differential quantity of heat and the melting point of polymers are described in the section of Examples.

If the amount of the component (A), propylene-based random copolymer of propylene and ethylene is smaller than 55 parts by weight, the low-temperature heat-sealability of the composition will be poor; but if larger than 99 parts by weight, the moldability of the composition will be poor and the properties of the films of the composition will be not good.

If Tc and Tm of the resin composition do not satisfy the relationship given by formula (III-1), the moldability of the composition will be poor and the properties of the films of the composition will be not good.

If the amount of the fraction of the composition, W0 (% by weight), eluted within the temperature range not higher than 0° C. in temperature-progranmmed fractionation chromatography (TREF) is larger than 6% by weight, films, sheets, fibers and other moldings of the composition will be much sticky and, in addition, they will be often troubled with additives and low-molecular-weight components bleeding out of their surfaces and will therefore have bad appearances.

[2] In one preferred embodiment of [1], the component (A) to be in the resin composition of the invention is preferably a specific propylene-based, propylene-ethylene random copolymer that satisfies the following (a'1) to (a'3):

(a'1) Its ethylene unit content, $\alpha$ (% by weight), as measured through $^{13}$C-NMR, falls between 0.2 and 10% by weight, preferably between 0.5 and 9% by weight, more preferably between 1 and 8% by weight, even more preferably between 3 and 7% by weight; and most preferably, its melting point, Tmr (° C.), as measured through differential scanning calorimetry, and a satisfy the relationship therebetween given by the following formula (a'1-2):

$Tmr \leq 160-5\alpha$ (a'1-2), preferably, $Tmr \leq 160-6\alpha$ (a'1-3);

(a'2) The amount of its fraction, Wpr (% by weight), eluted within the temperature range between (Tpr−5)° C. and (Tpr+5)° C. in temperature-programmed fractionation chromatography (TREF) is at least 20% by weight, with Tpr (° C.) being the peak temperature for essential elution, preferably satisfying the following formula (a'2-2):

$20 \leq Wpr$, and $80-15\alpha \leq Wpr$ (a'2-2), more preferably, $30 \leq Wpr$, and $90-12\alpha \leq Wpr$ (a'2-3);

even more preferably, the amount of its fraction, Whr (% by weight), that appears on the higher-temperature side relative to the essential elution peak and is therefore eluted within the temperature range not lower than (Tpr+5)° C. satisfies the following formula (a'2-4):

$0.1 \leq Whr \leq 3\alpha$ (a'2-4), preferably the following formula (a'2-5):

$0.1 \leq Whr$, and $3\alpha - 15 \leq Whr \leq 3\alpha - 3$ (a'2-5);

and (a'3) The amount of its fraction, W0r (% by weight), eluted within the temperature range not higher than 0° C. in temperature-programmed fractionation chromatography (TREF), and $\alpha$ (% by weight) satisfy the relationship therebetween given by the following formula (III-3):

$W0r \leq (3+2\alpha)/4$ (III-3), preferably by the following formula (a'3-2):

$W0r \leq (2+2\alpha)/4$ (a'3-2), more preferably, the amount of its fraction, Er (% by weight), extracted with boiling diethyl ether, and $\alpha$ (% by weight) satisfy the relationship therebetween given by the following formula (a'3-3):

$Er \leq 2.5$, and $Er \leq (2\alpha+15)/10$ (a'3-3), preferably by the following formula (a'3-4):

$Er \leq 2.0$, and $Er \leq (\alpha+5)/5$ (a'3-4).

[2-1] If the ethylene unit content, $\alpha$, of the propylene-based random copolymer is smaller than 0.2% by weight, not satisfying the requirement (a'1), the composition could not have good heat-sealability; but if larger than 10% by weight, films of the composition could not be tough. It is desirable that the melting point, Tmr (° C.), of the copolymer lowers with the increase in the ethylene unit content thereof. Therefore, if Tmr and $\alpha$ of the copolymer do not satisfy the above-mentioned formula (a'1-2), the heat-sealability of the composition will be poor and the anti-blocking characteristics thereof could not be good.

[2-2] As in (a'2), the amount of the fraction, Wpr (% by weight), of the propylene-based random copolymer, which is eluted within the temperature range between (Tpr−5)° C. and (Tpr+5)° C. in temperature-programmed fractionation chromatography (TREF), shall be at least 20% by weight, with Tpr (° C.) being the peak temperature for essential elution. Wpr smaller than 20% by weight means that the essential elution peak appearing in the elution curve of the copolymer trails significantly long to the higher-temperature side or to the lower-temperature side.

In other words, it means that the amount of the components of the copolymer that appear on the higher-temperature side and on the lower-temperature side is large. The higher-temperature side components, if too much in the copolymer, will lower the heat-sealability of the composition and will increase the dependency of the composition for its transparency on the molding condition. The lower-temperature side components, if too much in the copolymer, will make films, fibers, sheets and other moldings of the composition sticky.

Of the propylene-based random copolymer, the components that appear on the higher-temperature side relative to the essential elution peak of the copolymer are effective for improving the casting moldability including the chill roll releasability of the resin composition and to the toughness of the resin films formed by casting the composition. In addition, they are also effective for enhancing the compatibility of the copolymer with the component (B), propylene-based polymer. Accordingly, of the propylene-based random copolymer, the amount of the fraction, Whr (% by weight), eluted within the temperature range not lower than (Tp+5)° C. in temperature-programmed fractionation chromatography, preferably satisfies the requirement given by the formula (a'2-4).

[2-3] As in (a'3), the amount of the fraction, W0r (% by weight), of the propylene-based random copolymer which is eluted within the temperature range not higher than 0° C. in temperature-programmed fractionation chromatography (TREF), and α (% by weight) thereof shall satisfy the relationship therebetween given by the above-mentioned formula (III-3). If not, films, sheets, fibers and other moldings of the composition will be sticky, and, in addition, they will be often troubled with additives and low-molecular-weight components bleeding out of their surfaces and are therefore unfavorable.

More preferably, the amount of the fraction, Er (% by weight), of the copolymer which is extracted with boiling diethyl ether, and α (% by weight) thereof satisfy the relationship therebetween given by the above-mentioned formula (a'3-3). Films, sheets, fibers and other moldings of the composition containing the copolymer are good, as not sticky.

[2-4] Preferably, the propylene-based random copolymer has a melt index, MIr, of from 0.1 to 200 g/10 min. If MIr of the copolymer oversteps the defined range, the composition will have poor moldability and is unfavorable. More preferably, MIr of the copolymer falls between 1 and 40 g/10 min, even more preferably between 2 and 20 g/10 min.

[2-5] Also preferably, the stereospecificity index, Pr (mol %), of the propylene-based random copolymer which is measured through $^{13}$C-NMR is at least 98 mol %. If the stereospecificity index, Pr, of the copolymer is smaller than 98 mol %, films of the composition could not be tough and will have poor anti-blocking characteristics. More preferably, Pr is at least 98.5 mol %.

[2-6] Also preferably, the weight-average molecular weight, Mw, and the number-average molecular weight, Mn, of the propylene-based random copolymer, as measured through gel permeation chromatography (GPC), are in a ratio, Mw/Mn, of at most 6. Containing the copolymer that satisfies the requirement, films of the composition could be highly transparent. Still preferably, the ratio is at least 2 in view of the moldability of the composition. Especially preferably, $2.5 \leq Mw/Mn \leq 5$.

The methods for measuring the boiling diethyl ether extract, the comonomer content, the stereospecificity index, MI and Mw/Mn of the copolymer are described in the section of Examples.

[3] The method for producing the propylene-based random copolymer of [1] and [2] is described below.

The propylene-based random copolymer to be in the composition of the invention can be produced by copolymerizing propylene and ethylene in the presence of a catalyst which comprises (A) a solid catalyst component as prepared by contacting a magnesium compound and a titanium compound with each other in the presence of an electron donor compound and optionally a silicon compound, at a temperature falling between 120° C. and 150° C., followed by washing the resulting product with an inert solvent at a temperature falling between 100° C. and 150° C., (B) an organoaluminium compound, and optionally (C) a third component of an electron donor compound.

The catalyst components, the method for preparing the catalyst, and the method for polymerizing the monomers are mentioned below.

Catalyst Components (A) Solid Catalyst Component:

The solid catalyst component comprises magnesium, titanium and an electron donor, and is formed from (a) a magnesium compound, (b) a titanium compound, (c) an electron donor compound, and optionally (d) a silicon compound, which are as follows:

(a) Magnesium Compound:

For the details of the magnesium compound, referred to is the same as in the section of the first aspect of the invention.

(b) Titanium Compound:

For the details of the titanium compound, referred to is the same as in the section of the first aspect of the invention.

(c) Electron Donor Compound:

For the details of the electron donor compound, referred to is the same as in the section of the first aspect of the invention.

(d) Silicon Compound:

For the details of the silicon compound, referred to is the same as in the section of the first aspect of the invention.

(B) Organoaluminium Compound:

For the details of the organoaluminium compound (B) to be used in producing the propylene-based random copolymer for use in the invention, referred to is the same as in the section of the first aspect of the invention.

(C) Third Component (electron donor compound):

In producing the propylene-based random copolymer for use in the invention, an electron donor compound (C) may be used. For the details of the electron donor compound (C), referred to is the same as in the section of the first aspect of the invention.

Preparation of Solid Catalyst Component

The solid catalyst component (A) noted above may be prepared by bringing the magnesium compound (a), the titanium compound (b), the electron donor (c) and, if necessary, the silicon compound (d) into contact with each other in any known method, except for the temperature at which they are contacted with each other. The order in which they are brought into contact is not specifically defined. For example, the components may be brought into contact with each other in an inert solvent such as a hydrocarbon solvent, or they may be first diluted with an inert solvent such as a hydrocarbon solvent and then contacted with each other. For the details of preparing the solid catalyst component, referred to is the same as in the section of the first aspect of the invention.

Polymerization Method

The amount of the catalyst to be used in producing the propylene-based random copolymer for use in the invention is not specifically defined. For example, the solid catalyst component (A) maybe used in an amount of generally from 0.00005 to 1 mmol, in terms of the titanium atom content thereof, relative to one liter of the reaction system. Regarding the amount of the component (B), organoaluminium compound to be used, the atomic ratio of aluminium/titanium may fall generally between 1 and 1000, but preferably between 10 and 500. If the atomic ratio oversteps the defined range, the catalyst activity will be poor. Regarding the amount of the third component (C), electron donor compound such as an organosilicon compound, if used, the molar ratio of electron donor compound (C)/organoaluminium compound (B) may fall generally between 0.001 and 5.0, but preferably between 0.01 and 2.0, more preferably between 0.05 and 1.0. If the molar ratio oversteps the defined range, the catalyst could not exhibit satisfactory activity and stereospecificity. However, if the catalyst is subjected to prepolymerization and the thus pre-treated catalyst is used, the amount of the third component (C) may be reduced to be smaller than the defined range.

In the invention, if desired, before the polymerization in the presence of the catalyst to produce the propylene-based random copolymer, olefin prepolymerization in the presence of the same may be performed. This is for realizing high catalytic activity and high stereospecificity of the catalyst and for improving the powdery morphology of the copolymer produced. In that case, an olefin is first prepolymerized in the presence of the catalyst as prepared by mixing the solid catalyst component (A), the organic aluminium compound (B) and, if necessary, the electron donor compound (C) in a predetermined ratio, generally at a temperature falling between 1 and 100° C. under a pressure falling between ordinary pressure and 50 kg/cm$^2$G or so, and thereafter propylene is copolymerized with a comonomer, ethylene, in the presence of the catalyst and the prepolymer having been formed in the previous prepolymerization step.

For the details of olefins for prepolymerization, referred to is the same as in the section of the first aspect of the invention.

The mode of polymerization to produce the copolymer for use in the invention is not specifically defined, and may be among of the following: solution polymerization, slurry polymerization, vapor-phase polymerization, bulk polymerization. Any of batch polymerization and continuous polymerization may apply to the polymerization mode, and two-stage or multi-stage polymerization under different conditions also may apply thereto.

Regarding the reaction conditions, the polymerization pressure is not specifically defined and may fall generally between atmospheric pressure and 80 kg/cm$^2$G, but preferably between 2 and 50 kg/cm$^2$G; and the polymerization temperature may fall generally between 0 and 200° C., but preferably between 20 and 90° C., more preferably between 40 and 90° C., in view of the polymerization efficiency. The polymerization time varies, depending on the temperature at which the starting propylene and ethylene are polymerized, and therefore could not be unconditionally defined. In general, however, the polymerization time may fall between 5 minutes and 20 hours, preferably between 10 minutes and 10 hours or so. The blend ratio of the starting monomers varies, depending on the polymerization temperature and pressure, and therefore could not be unconditionally defined. In general, however, the ethylene fraction may fall between 0.1 and 20 mol %, with the balance of propylene. The molecular weight of the copolymers to be produced in that manner may be controlled by adding a chain transfer agent, preferably hydrogen to the reaction system. If desired, the polymerization may be effected in the presence of an inert gas such as nitrogen or the like.

If desired, the monomers may be polymerized in two or more stages under different polymerization conditions.

Regarding the catalyst components for use in the invention to produce the propylene-based random copolymer, the components (A), (B) and (C) may be previously mixed in a predetermined ratio and brought into contact with each other, and, immediately after the preparation of the catalyst in that manner, propylene and ethylene may be polymerized in the presence of the catalyst; or after the catalyst thus prepared has been aged for 0.2 to 3 hours or so, propylene and ethylene may be polymerized in the presence of it. The catalyst components may be used after having been suspended in an inert solvent or propylene.

In the invention, the propylene-based random copolymer having been prepared through polymerization in the manner as above may be subjected to post-treatment in any ordinary manner. For example, the powdery copolymer as produced in vapor-phase polymerization is taken out of the polymerization reactor, and a nitrogen stream may be introduced thereinto so as to remove the non-reacted olefins from the copolymer. If desired, the copolymer may be pelletized through an extruder. In this case, a small amount of water, alcohol or the like may be added to the copolymer so as to completely render the catalyst inactive. The copolymer as produced in bulk polymerization is taken out of the polymerization reactor, the non-reacted monomers are completely removed from it, and the resulting copolymer may be pelletized.

[3] Resin Composition:

The resin composition of the invention may be produced by blending the component (A), propylene-based random copolymer, and the component (B), propylene-based polymer, in a predetermined ratio, optionally along with various additives such as antioxidants, neutralizing agents, anti-blocking agents, slip agents, antistatic agents, nucleating agents, etc., followed by kneading and granulating the resulting blend by the use of a double-screw kneader or the like.

The optional additives that may be added to the composition include antioxidants, neutralizing agents, slip agents, anti-blocking agents, anti-frosting agents, antistatic agents, etc. One or more of such additives may be added to the composition either singly or as combined. For the details of the antioxidants, neutralizing agents, slip agents, and anti-blocking agents for use herein, referred to is the same as in the section of the first aspect of the invention.

The resin composition of the invention is principally used for forming films. Regarding the additive formulation for films of the resin composition, referred to is the same as in the section of the first aspect of the invention.

[4] Films:

The films of the invention are formed from the propylene-based resin composition mentioned above. The method for forming the films is not specifically defined, and any and every method of sheeting polymers through melt extrusion is employable for sheeting the composition of the invention. For the details of the film-forming method, referred to is the same as in the section of the first aspect of the invention.

Fourth Aspect of the Invention

The fourth aspect of the invention (this will be simply referred to as "the invention" in this section) is to provide a multi-layered, propylene-based resin laminate. More precisely, it provides a multi-layered, propylene-based resin laminate, of which at least one outermost layer (this will be referred to as a heat-seal layer) is not sticky and is made of a specific propylene-based polymer having good low-temperature heat-sealability. The multi-layered, propylene-based resin laminate of the invention is described in detail hereinunder.

Of the multi-layered, propylene-based resin laminate of the invention, at least one outermost layer is a layer of the following propylene-based polymer [A]:

Propylene-based Polymer [A], which is a propylene-based, propylene-ethylene random copolymer satisfying the following <1> to <3>:
<1> Its ethylene unit content, γ, as measured through $^{13}$C-NMR, falls between 0.2 and 10% by weight;
<2> The amount of its fraction, Wp, eluted within the temperature range between (Tp−5)° C. and (Tp+5)° C. in temperature-programmed fractionation chromatography is at least 20% by weight, with Tp (° C.) being the peak temperature for essential elution;
<3> The amount of its fraction, W0 (% by weight), eluted within the temperature range not higher than 0° C. in temperature-programmed fractionation chromatography, and γ satisfy the relationship therebetween given by the following formula (A1):

$$W0 \leq (3+2\gamma)/4 \tag{A1}.$$

Propylene-based polymer [A] is described in detail.

Propylene-based Polymer [A]

The propylene-based copolymer [A] for use in the invention is a propylene-ethylene random copolymer that satisfies the following <1> to <3>.

<1> Its ethylene unit content, γ, as measured through $^{13}$C-NMR, falls between 0.2 and 10% by weight.

Preferably, γ falls between 0.5 and 9% by weight, more preferably between 1 and 8% by weight, most preferably between 3 and 7% by weight.

If γ is smaller than 0.2% by weight, the heat-sealability of the copolymer is poor; but if larger than 10% by weight, films of the copolymer could not be tough and are therefore not good.

It is desirable that the propylene-based random copolymer for use in the invention further satisfies the condition <4> that its melting point, Tm (° C.), as measured through differential scanning calorimetry (DSC), and γ satisfy the relationship therebetween given by the following formula (A2):

$$Tm \leq 160-5\gamma \tag{A2},$$

more preferably, $$Tm \leq 160-6\gamma \tag{A5}.$$

If not satisfying the condition, the copolymer will have poor heat-sealability, and its anti-blocking characteristics will be not good.

<2> The amount of its fraction, Wp (% by weight), eluted within the temperature range between (Tp−5)° C. and (Tp+5)° C. in temperature-programmed fractionation chromatography is at least 20% by weight, with Tp (° C.) being the peak temperature for essential elution.

Preferably, Wp satisfies the following:

$$20 \leq Wp, \text{ and } (80-15\gamma) \leq Wp \tag{A6},$$

more preferably, $$30 \leq Wp, \text{ and } (90-12\gamma) \leq Wp \tag{A7}.$$

Wp smaller than 20% by weight means that the essential elution peak appearing in the elution curve of the copolymer trails long to the higher-temperature side and/or to the lower-temperature side. The components appearing on the lower-temperature side are undesirable, as making the copolymer films sticky; and those appearing on the higher-temperature side are also undesirable, as detracting from the heat-sealability of the copolymer and increasing the dependency of the copolymer for its transparency on the molding condition.

Of the propylene-based random copolymer for use in the invention, the components that appear on the higher-temperature side relative to the essential elution peak of the copolymer may contribute to the moldability including the chill roll releasability of the copolymer and to the toughness of the copolymer films. Therefore, the presence of the components in some degree in the copolymer is preferred to the absence thereof. Accordingly, <5> the amount of the fraction, WH (% by weight), of the propylene-based random copolymer of the invention, which is eluted within the temperature range not lower than (Tp+5)° C. in temperature-programmed fractionation chromatography, and γ preferably satisfy the relationship therebetween given by the following formula (A3):

$$0.1 \leq WH \leq 3\gamma \tag{A3},$$

more preferably, $$WH \leq (3\gamma-3), \text{ and } (3\gamma-15) \leq WH \tag{A8}.$$

<3> Of the copolymer, the amount of the fraction, W0 (% by weight), eluted within the temperature range not higher than 0° C. in temperature-programmed fractionation chromatography, and γ satisfy the relationship therebetween given by the following formula (A1):

$$W0 \leq (3+2\gamma)/4 \tag{A1},$$

preferably, $$W0 \leq (2+2\gamma)/4 \tag{A9}.$$

If W0 does not satisfy the relationship of (A1), the copolymer films will be sticky and will be often troubled with additives and low-molecular-weight components bleeding out of their surfaces, and are therefore not good.

<6> Of the propylene-based random copolymer for use in the invention, the amount of the fraction, E (% by weight), extracted with boiling diethyl ether is preferably at most 2.5% by weight, and E and γ preferably satisfy the relationship therebetween given by the following formula (A4):

$$E \leq (2\gamma+15)/10 \tag{A4},$$

more preferably, $$E \leq (\gamma+5)/5 \tag{A10}.$$

Satisfying the condition as above, the copolymer films are not sticky and are therefore good.

Of the propylene-based random copolymer of the invention, the melt index, MI, preferably falls between 0.1 and 200 g/10 min, more preferably between 1 and 40 g/10 min, even more preferably between 2 and 20 g/10 min. If its MI oversteps the defined range, the moldability of the copolymer will be poor.

Of the propylene-based random copolymer for use in the invention, the stereospecificity index, P, as measured through $^{13}$C-NMR, is preferably at least 98 mol %, more preferably at least 98.5 mol %. If its stereospecificity index, P, is smaller than 98 mol %, films of the copolymer could not be tough and will have poor anti-blocking characteristics.

Also preferably, the weight-average molecular weight, Mw, and the number-average molecular weight, Mn, of the propylene-based random copolymer, as measured through gel permeation chromatography (GPC), are in a ratio, Mw/Mn, falling between 2 and 6. The copolymer that satisfies the requirement is favorable as its moldability is good and its films are highly transparent. More preferably, the ratio, Mw/Mn, falls between 2.5 and 5.

The data, γ, Tm, Wp, WH, W0, E, MI, P and Mw/Mn of the copolymer are measured according to the methods described in the section of Examples.

Also preferably, the tensile modulus, TM (MPa), and the heat-sealing temperature, HST (° C.), of the multi-layered, propylene-based resin laminate of the invention satisfy the following relationship therebetween:

$$TM \geq 40 \times HST - 4000 (HST \geq 115),$$

and $$TM \geq 600(HST<115),$$

more preferably, $$TM \geq 40 \times HST - 3900(HST \geq 115),$$

and $$TM \geq 700(HST<115),$$

even more preferably, $$TM \geq 40 \times HST - 3800(HST \geq 115),$$

and $$TM \geq 800(HST<115).$$

Of the multi-layered, propylene-based resin laminate of the invention, at least one outermost layer (this may be referred to as a heat-seal layer) shall be made of the propylene-based polymer [A] as above, and the other layers (these may be interlayers or laminate layers) of the laminate are not specifically defined with respect to their constitution. The other layers except the specific outermost layer may be made of the same propylene-based polymer [A] or may be made of any other different polymer. Preferably, at least one of the other layers is made of the propylene-based polymer [A] which is different from that in the outermost layer in point of its ethylene content, or is made of a propylene-based polymer of propylene, ethylene and butene-1. More concretely, the polymers for the other layers are selected from the propylene-based polymer [A], of which the ethylene content is smaller than that of the propylene-based polymer [A] for the outermost layer, and/or propylene-based polymers of propylene, ethylene and butene-1.

The other propylene-based polymers except the propylene-based polymer [A] may be crystalline propylene-based polymers. The crystalline propylene-based polymers are not specifically defined, including, for example, propylene homopolymers, propylene-ethylene random copolymers, propylene-ethylene-1-butene random copolymers, propylene-ethylene block copolymers, etc. In any case, the molecular weight of the crystalline propylene-based polymers shall be controlled from the viewpoint of the moldability of the polymers. For example, for forming them into films by T-die casting, the polymers preferably have a melt index of from 2 to 20 g/10 min or so; and for sheeting them, the polymers preferably have a melt index of from 1 to 10 g/10 min or so. From the polymers, desired ones are selected in accordance with the intended use of their films and sheets. Concretely, for example, propylene homopolymers having a high degree of crystallinity are favorable to films and sheets that are required to have good heat resistance and good heat-seal strength. Examples of the propylene homopolymers are given in Japanese Patent Laid-Open No. 85711/1996.

Preferred are polypropylenic polymers (1) having an isotactic pentad fraction, P, (this indicates the stereospecificity index of the polymers) of from 85.0 to 92.0 mol %, and having an n-heptane insoluble content, H, of from 97.0 to 98.0% by weight, with P and H satisfying the following formula:

$$0.750P+27.125<H,$$

and (2) having a melt index, MI, of from 1 to 20 g/10 min, with MI satisfying the following formula:

$$\tau \leq 0.65 - 0.025MI$$

where $\tau$ (sec) indicates the relaxation time as obtained through frequency dispersion measurement at 175° C. and at a frequency, $\omega 0=10°$ rad/sec.

More preferred are polypropylenic polymers (1') having an isotactic pentad fraction, P, (this indicates the stereospecificity index of the polymers) of from 85.0 to 92.0 mol %, and having an n-heptane insoluble content, H, of from 86.0 to 97.0% by weight, with P and H satisfying the following formula:

$$0.750P+26.000<H,$$

and (2') having a melt index, MI, of from 1 to 25 g/10 min, with MI satisfying the following formula:

$$\tau \leq 0.63 - 0.025MI$$

where $\tau$ (sec) indicates the relaxation time as obtained through frequency dispersion measurement at 175° C. and at a frequency, $\omega 0=10°$ rad/sec.

The meanings of P, H, MI $\omega 0$ and $\tau$, the methods for measuring them, and the method for producing the propylene-based polymers are described in Japanese Patent Laid-Open No. 85711/1996.

For giving films and sheets having better low-temperature heat-sealability, preferred are crystalline propylene-based polymers of propylene-ethylene random copolymers or propylene-ethylene-1-butene random copolymers having good low-temperature heat-sealability. For example, they are described in Japanese Patent Laid-Open Nos. 208629/1997, 272718/1997, 130336/1998, etc. Concretely mentioned are propylene-based, propylene-ethylene copolymers satisfying the following <1> to <5> (as in Japanese Patent Laid-Open No. 208629/1997):

<1> The ethylene unit content, $\chi$ (% by weight), of the copolymer falls between 3 and 10% by weight;

<2> The melt index, MI (g/10 min), of the copolymer falls between 4 and 12 g/10 min;

<3> The fraction of the copolymer, E (% by weight), extracted with boiling diethyl ether, and $\chi$ satisfy the relationship therebetween given by the following formula (I) or (II):

$$E \leq 0.25\chi + 1.1 (\chi = 3 \text{ to } 6 \text{ wt. \%}) \qquad (I),$$

$$E \leq 2.6 (\chi = 6 \text{ to } 10 \text{ wt. \%}) \qquad (II);$$

<4> The melting point of the copolymer, Tm (° C.), measured through differential scanning calorimetry, and $\chi$ satisfy the relationship therebetween given by the following formula (III) or (IV):

$$Tm \leq 140 (\chi = 3 \text{ to } 5 \text{ wt. \%}) \qquad (III),$$

$$Tm \leq 165 - 5\chi (\chi = 5 \text{ to } 10 \text{ wt. \%}) \qquad (IV);$$

<5> The isotactic triad fraction of the copolymer, mm (mol %), in its PPP chain moiety, as measured through $^{13}$C-NMR, is at least 98.0 mol %.

Also mentioned are propylene-based, propylene-ethylene random copolymers satisfying the following <1> to <5> (as in Japanese Patent Laid-Open No. 272718/1997):

<1> The ethylene unit content, $\chi$ (% by weight), of the copolymer falls between 0.2 and 4% by weight;

<2> The melt index, MI (g/10 min), of the copolymer falls between 4 and 12 g/10 min;

<3> The fraction of the copolymer, E (% by weight), extracted with boiling diethyl ether, and $\chi$ satisfy the relationship therebetween given by the following formula (IV-1):

$$E \leq 0.25\chi + 1.1 \quad \text{(IV-1)};$$

<4> The melting point of the copolymer, Tm (° C.), measured through differential scanning calorimetry, and $\chi$ satisfy the relationship therebetween given by the following formula (IV-2):

$$Tm \leq 165 - 5\chi \quad \text{(IV-2)};$$

<5> The isotactic triad fraction of the copolymer, mm (mol %), in its PPP chain moiety, as measured through $^{13}$C-NMR, is at least 98.0 mol %.

Also usable herein are ethylene/1-butene/propylene copolymers such as those described in Japanese Patent Laid-Open No. 60639/1999. Concretely mentioned are propylene-based random copolymers of propylene, ethylene and 1-butene that satisfy the following <1> to <6>:

<1> The ethylene unit content, $\alpha$ (mol %), and the 1-butene unit content, $\beta$ (mol %), of the copolymer satisfy the following formula (IV-1):

$$4 \leq \alpha + \beta \leq 15 \quad \text{(IV-1)};$$

<2> The melt index, MI (g/10 min), of the copolymer falls between 1 and 12 g/10 min;

<3> The boiling diethyl ether extract, E, of the copolymer and ($\alpha+\beta$) thereof satisfy the following formula (IV-2) when ($\alpha+\beta$)$\leq$12, and satisfy the following formula (IV-3) when ($\alpha+\beta$)>12:

$$E \leq 0.2(\alpha+\beta) + 0.6 \quad \text{(IV-2)},$$

$$E \leq 3.0 \quad \text{(IV-3)};$$

<4> The melting point, Tm (° C.), of the copolymer, as measured through differential scanning calorimetry, and ($\alpha+\beta$) satisfy the following formula (IV-4):

$$Tm \leq 164 - 3.6(\alpha+\beta) \quad \text{(IV-4)};$$

<5> The stereospecificity index, P (mol %), of the copolymer, as measured through $^{13}$C-NMR, is at least 98 mol %;

<6> The weight-average molecular weight, Mw, and the number-average molecular weight, Mn, of the copolymer, as measured through gel permeation chromatography (GPC), are in a ratio, Mw/Mn, of at most 6; (as in Japanese Patent Laid-Open No. 60639/1999).

The meanings of the parameters, the methods for measuring them, and the method for producing the polymers are described in the laid-open patent specifications.

Propylene-based polymers with no crystallinity are unfavorable to the invention, as their films and sheets will be not tough and will be not resistant to heat.

The interlayers and laminate layers of the multi-layered laminate of the invention may be resin layers of a dry blend or a melt blend of the propylene-based random copolymer and the crystalline propylene-based polymer. The dry blend may be prepared in a Henschel mixer or the like. The melt blend of the copolymer may be prepared in a single-screw or double-screw extruder, a Banbury mixer or the like. Regarding the blend ratio, the amount of the propylene-based random copolymer generally falls between 1 and 99% by weight, preferably between 10 and 90% by weight, more preferably between 20 and 80% by weight. If the amount of the propylene-based random copolymer is smaller than 1% by weight, the transparency and the impact resistance of the resin layers will be poor.

The method for producing the propylene-based random copolymer (propylene-based polymer [A]) is described below.

The propylene-based random copolymer for use in the invention can be produced by copolymerizing propylene and ethylene in the presence of a catalyst which comprises (A) a solid catalyst component as prepared by contacting a magnesium compound and a titanium compound with each other in the presence of an electron donor compound and optionally a silicon compound, at a temperature falling between 120° C. and 150° C., followed by washing the resulting product with an inert solvent at a temperature falling between 100° C. and 150° C., (B) an organoaluminium compound, and optionally (C) a third component of an electron donor compound.

The catalyst components, the method for preparing the catalyst, and the method for polymerizing the monomers are mentioned below.

Catalyst Components (A) Solid Catalyst Component:

The solid catalyst component comprises magnesium, titanium and an electron donor, and is formed from (a) a magnesium compound, (b) a titanium compound, (c) an electron donor compound, and optionally (d) a silicon compound, which are as follows:

(a) Magnesium Compound:

For the details of the magnesium compound, referred to is the same as in the section of the first aspect of the invention.

(b) Titanium Compound:

For the details of the titanium compound, referred to is the same as in the section of the first aspect of the invention.

(c) Electron Donor Compound:

For the details of the electron donor compound, referred to is the same as in the section of the first aspect of the invention.

(d) Silicon Compound:

For the details of the silicon compound, referred to is the same as in the section of the first aspect of the invention.

(B) Organoaluminium Compound:

For the details of the organoaluminium compound (B) to be used in producing the propylene-based random copolymer for use in the invention, referred to is the same as in the section of the first aspect of the invention.

(C) Third Component (electron donor compound):

In producing the propylene-based random copolymer for use in the invention, an electron donor compound (C) may be used. For the details of the electron donor compound (C), referred to is the same as in the section of the first aspect of the invention.

Preparation of Solid Catalyst Component

The solid catalyst component (A) noted above may be prepared by bringing the magnesium compound (a), the titanium compound (b), the electron donor (c) and, if necessary, the silicon compound (d) into contact with each other in any known method, except for the temperature at which they are contacted with each other. The order in which they are brought into contact is not specifically defined. For example, the components may be brought into contact with each other in an inert solvent such as a hydrocarbon solvent, or they may be first diluted with an inert solvent such as a hydrocarbon solvent and then contacted with each other. For the details of preparing the solid catalyst component, referred to is the same as in the section of the first aspect of the invention.

Polymerization Method

The amount of the catalyst to be used in producing the propylene-based random copolymer for use in the invention is not specifically defined. For example, the solid catalyst component (A) may be used in an amount of generally from 0.00005 to 1 mmol, in terms of the titanium atom content thereof, relative to one liter of the reaction system. Regarding the amount of the component (B), organoaluminium compound to be used, the atomic ratio of aluminium/titanium may fall generally between 1 and 1000, but preferably between 10 and 500. If the atomic ratio oversteps the defined range, the catalyst activity will be poor. Regarding the amount of the third component (C), electron donor compound such as an organosilicon compound, if used, the molar ratio of electron donor compound (C)/organoaluminium compound (B) may fall generally between 0.001 and 5.0, but preferably between 0.01 and 2.0, more preferably between 0.05 and 1.0. If the molar ratio oversteps the defined range, the catalyst could not exhibit satisfactory activity and stereospecificity. However, if the catalyst is subjected to prepolymerization and the thus pre-treated catalyst is used, the amount of the third component (C) may be reduced to be smaller than the defined range.

In the invention, if desired, before the polymerization in the presence of the catalyst to produce the propylene-based random copolymer, olef in prepolymerization in the presence of the same may be performed. This is for realizing high catalytic activity and high stereospecificity of the catalyst and for improving the powdery morphology of the copolymer produced. In that case, an olefin is first prepolymerized in the presence of the catalyst as prepared by mixing the solid catalyst component (A), the organic aluminium compound (B) and, if necessary, the electron donor compound (C) in a predetermined ratio, generally at a temperature falling between 1 and 100° C. under a pressure falling between ordinary pressure and 50 kg/cm$^2$G or so, and thereafter propylene is copolymerized with a comonomer, ethylene, in the presence of the catalyst and the prepolymer having been formed in the previous prepolymerization step.

For the details of olefins for prepolymerization, referred to is the same as in the section of the first aspect of the invention.

The mode of polymerization to produce the copolymer for use in the invention is not specifically defined, and may be among of the following: solution polymerization, slurry polymerization, vapor-phase polymerization, bulk polymerization. Any of batch polymerization and continuous polymerization may apply to the polymerization mode, and two-stage or multi-stage polymerization under different conditions also may apply thereto.

Regarding the reaction conditions, the polymerization pressure is not specifically defined and may fall generally between atmospheric pressure and 80 kg/cm$^2$G, but preferably between 2 and 50 kg/cm$^2$G; and the polymerization temperature may fall generally between 0 and 200° C., but preferably between 20 and 90° C., more preferably between 40 and 90° C., in view of the polymerization efficiency. The polymerization time varies, depending on the temperature at which the starting propylene and ethylene are polymerized, and therefore could not be unconditionally defined. In general, however, the polymerization time may fall between 5 minutes and 20 hours, preferably between 10 minutes and 10 hours or so. The blend ratio of the starting monomers varies, depending on the polymerization temperature and pressure, and therefore could not be unconditionally defined. In general, however, the ethylene fraction may fall between 0.1 and 20 mol %, with the balance of propylene. The molecular weight of the copolymers to be produced in that manner may be controlled by adding a chain transfer agent, preferably hydrogen to the reaction system. If desired, the polymerization may be effected in the presence of an inert gas such as nitrogen or the like.

If desired, the monomers may be polymerized in two or more stages under different polymerization conditions.

Regarding the catalyst components for use in the invention to produce the propylene-based random copolymer, the components (A), (B) and (C) may be previously mixed in a predetermined ratio and brought into contact with each other, and, immediately after the preparation of the catalyst in that manner, propylene and ethylene may be polymerized in the presence of the catalyst; or after the catalyst thus prepared has been aged for 0.2 to 3 hours or so, propylene and ethylene may be polymerized in the presence of it. The catalyst components may be used after having been suspended in an inert solvent or propylene.

In the invention, the propylene-based random copolymer having been prepared through polymerization in the manner as above may be subjected to post-treatment in any ordinary manner. For example, the powdery copolymer as produced in vapor-phase polymerization is taken out of the polymerization reactor, and a nitrogen stream may be introduced thereinto so as to remove the non-reacted olefins from the copolymer. If desired, the copolymer may be pelletized through an extruder. In this case, a small amount of water, alcohol or the like may be added to the copolymer so as to completely render the catalyst inactive. The copolymer as produced in bulk polymerization is taken out of the polymerization reactor, the non-reacted monomers are completely removed from it, and the resulting copolymer may be pelletized.

If desired, various additives may be added to the propylene-based random copolymer in powder. The optional additives that may be added to the copolymer include antioxidants, neutralizing agents, slip agents, anti-blocking agents, anti-frosting agents, antistatic agents, etc. One or more of such additives may be added to the copolymer either singly or as combined.

For the details of the antioxidants, neutralizing agents, slip agents, and antiblocking agents for use herein, referred to is the same as in the section of the first aspect of the invention.

The method for producing the multi-layered, propylene-based resin laminate of the invention is not specifically defined. For example, the laminate may be produced through co-extrusion of resin melts. Above all, especially preferred is a high-speed T-die casting method for which is used a high-performance, large-size casting machine. In the method, the take-up speed may be 50 m/min or more for high-speed sheeting. The thickness of the multi-layered laminate is not specifically defined, but generally falls between 10 and 5000 μm or so.

The invention is described concretely with reference to the following Examples.

First Aspect of the Invention

[Resin evaluation]

<1> Measurement of Ethylene Unit Content, α (% by weight), and Stereospecificity Index, P (mol %), through $^{13}$C-NMR:

Using a JEOL's NMR apparatus, JNM-EX400 Model, each sample was subjected to $^{13}$C-NMR spectrometry under the condition mentioned below.

Sample concentration: 220 mg/3 ml NMR solvent.

NMR solvent: 1,2,4-trichlorobenzene/benzene-d6 (90/10 vol. %).

Temperature: 130° C.

Pulse width: 45°.

Pulse pitch: 4 sec.

Number of cycles: 4000.

The chemical shift for each spectral signal appearing in the $^{13}$C-NMR pattern of the propylene-based random copolymer samples tested, and its assignment are given in Table I-1. For the chemical shift of the signals (1), (11), (12) and (13), shown are the ranges for calculation; and for that of the other signals, shown are the peak top positions. The ranges for calculation for all signals are given in Table I-2. In these Tables, P indicates a propylene unit, and E indicates an ethylene unit. Accordingly, in these, PPP indicate three propylene units connected in series, and EEE indicate three ethylene units connected in series.

TABLE I-1

Assignment List (ppm)

| Number | Chemical Shift | Assignment |
|---|---|---|
| (1) | 45.1–47.3 | PPP Sαα |
| (2) | 38.0 | Sαγ |
| (3) | 37.5 | Sαδ |
| (4) | 33.3 | EPE Tδδ |
| (5) | 31.0 | PPE Tβδ |
| (6) | 30.5 | PEEE Sγδ |
| (7) | 30.0 | EEE Sδδ |
| (8) | 29.0 | PPP Tββ |
| (9) | 27.3 | PEE Sβδ |
| (10) | 24.6 | PEP Sββ |
| (11) | 21.3–22.7 | Pββ |
| (12) | 20.6–21.3 | Pββ |
| (13) | 19.8–20.6 | Pββ |

TABLE I-2

Assignment List (ppm)

| Number | Range for Calculation | Assignment |
|---|---|---|
| (1) | 45.1–47.3 | PPP Sαα |
| (2) | 37.7–38.3 | Sαγ |
| (3) | 37.4–37.7 | Sαδ |
| (4) | 33.2–33.4 | EPE Tδδ |
| (5) | 30.9–31.3 | PPE Tβδ |
| (6) | 30.3–30.5 | PEEE Sγδ |
| (7) | 29.9–30.1 | EEE Sδδ |
| (8) | 28.3–29.7 | PPP Tββ |
| (9) | 27.2–27.6 | PEE Sβδ |
| (10) | 24.0–25.0 | PEP Sββ |
| (11) | 21.3–22.7 | Pββ |
| (12) | 20.6–21.3 | Pββ |
| (13) | 19.8–20.6 | Pββ |

Note)
Chemical shift standard: peak top for Sδδ, 30.01 ppm.

The ethylene unit content, α (mol %), of each propylene-based random copolymer was obtained according to the following formula, based on the signal data of the $^{13}$C-NMR spectral pattern of the copolymer.

$$\alpha = 2X/(300-X) \times 100$$

wherein, $$X = Et/S \times 100,$$

$$Et = IEEE + \tfrac{2}{3}(IPEE + IEPE) + \tfrac{1}{3}(IPPE + IPEP),$$

$$S = IEPE + IPPE + IEEE + IPPP + IPEE + IPEP,$$

IEPE=I(4), IPPP=I(8),

IPPE=I(5), IPEE=I(9),

IEEE=I(7)/2+I(6)/4, IPEP=I(10).

In these, for example, I(1) indicates the signal strength of the signal number (1) in Tables I-1 and I-2.

The stereospecificity index, P (mol %), of each copolymer was obtained according to the following formula:

$$P = \{I(11)/(I(11)+I(12)+I(13)-I(4)-I(5))\} \times 100.$$

This P indicates the isotactic fraction of triad units in the propylene chain region in the copolymer molecular chain. In this formula, the signal strength of the methyl carbon in the center propylene unit of PPE chains, which appears in the mr region, is substituted with the signal strength for Sαγ (second signal); and the signal strength of the methyl carbon in the propylene unit of EPE chains, which appears in the rr region, is substituted with the signal strength for Tδδ (fourth signal).

<2> Temperature-programmed Fractionation Chromatography (TREF):

A sample solution was introduced into the TREF column controlled at 135° C., then gradually cooled therein to 0° C. at a cooling rate of 5° C./hr, whereby the sample was adsorbed by the filler. Next, the column was heated up to 135° C. at a heating rate of 40° C./hr, and the elution pattern curve of the sample was obtained.

The apparatus used, and the condition for measurement are shown below.

1) Apparatus:

TREF column: GL Science's silica gel column (4.6φ×150 mm).

Flow cell: from GL Science (optical guide length 1 mm, with KBr cell).

Feed pump: Senshu Science's pump, SSC-3100.

Valve oven: GL science's oven, Model 554.

TREF oven: from GL science.

Two-line temperature controller: Rigaku Kogyo's temperature controller, REX-C100.

Detector: Foxboro's IR detector for liquid chromatography, MIRAN 1A CVF.

10-way valve: Balco's electromotive valve.

Loop: Balco's 500 μl loop.

2) Condition for Measurement:

Solvent: ortho-dichlorobenzene.

Sample concentration: 7.5 g/liter.

Sample amount: 500 μl.

Pump flow rate: 2.0 ml/min.

Wavelength for detection: 3.41 μm.

Column filler: Chromosorb P (30 to 60 mesh).

Column temperature distribution: within ±2.0° C.

<3> Melting Point, Tm (° C.), of Copolymer in Differential Scanning Colorimetry (DSC):

A differential scanning calorimeter (Parkin Elmer's DSC-7) was used. 10 mg of a sample was first melted in a nitrogen atmosphere at 230° C. for 3 minutes, and then cooled to 20° C. at a cooling rate of 10° C./min. Next, the cooled sample was kept at that temperature, 20° C. for 3 minutes, and then again heated at a heating rate of 10° C./min. In the endothermic curve indicating the melting profile of the sample, thus obtained, the temperature for the peak top of the highest peak was read. This is the melting point of the sample.

<4>Boiling Diethyl Ether Extract, E (% by weight), of Copolymer:

3 g of 1 mm$\phi$ mesh-pass pellets of a copolymer sample were put into a cylindrical paper filter. 160 ml of an extraction solvent, diethyl ether was put into a flat bottom flask. These were set in a Soxhlet extractor, and the sample was extracted for 10 hours at a frequency of ref luxing of once/5 minutes or so. The resulting diethyl ether extract was recovered with a rotary evaporator, and then dried in a vacuum drier until it came to have a constant weight. The weight indicates the boiling diethyl ether extract of the sample.

<5> Melt Index, MI (g/10 min):

Measured according to JIS K7210, at a temperature of 230° C. and under a load of 2160 g.

[Film quality evaluation]

Films were all annealed at 40° C. for 24 hours, and then conditioned at a temperature of 23±2° C. at a humidity of 50±10% for at least 16 hours. The properties of the thus-conditioned films were measured at the same temperature and at the same humidity.

<1> Heat-sealing Temperature:

The heat-sealing temperature of films was measured according to JIS Z-1707. Concretely, films were heat-sealed by the use of a heat seal bar under the condition mentioned below, then left at room temperature for one full day, and subjected to a 90-degree peel test at a peel rate of 200 mm/min at room temperature to measure the peel strength of the films. The temperature of the heat seal bar used in the test was calibrated with a surface thermometer. The data were plotted to give a heat-sealing temperature-peel strength curve, from which the temperature at which the peel strength was 300 g/15 mm was derived. This is the heat-sealing temperature of the sample tested. The peel strength 300 g/15 mm means that the actual load for peeling the sample having a width of 15 mm is 300 g.

Sealing Condition:

Sealed surfaces: metal-rolled surface/metal-rolled surface.

Sealed area: 15 mm×10 mm.

Sealing pressure: 2.0 kg/cm$^2$.

Sealing time: 1 sec.

Sealing temperature: varied to some points. The heat-sealing temperature was determined through interpolation.

<2> Anti-blocking Characteristics:

Two films were contacted with each other in such a manner that the metal-rolled surface of one film could face the surface of the other film opposite to its metal-rolled surface. Being thus contacted with each other, the films were fixed to a tool having a blocking test area of 10 cm×10 cm, and airtightly adhered to each other under the conditions mentioned below. Then, these were peeled under the condition mentioned below to measure the peel strength of the blocked area of 10 cm×10 cm. The peel strength thus measured indicates the anti-blocking characteristics of the films tested.

Condition 1 for Adhesion:

Temperature: 60° C.

Period: 3 hours.

Load: 36 g/cm$^2$.

Area: 10 cm×10 cm.

Condition 2 for Adhesion:

Temperature: 50° C.

Period: 7 days.

Load: 15 g/cm$^2$.

Area: 10 cm×10 cm.

Condition for Peel Test:

Test speed: 20 mm/min.

Load cell: 2 kg

<3> Slip Characteristics:

A slat covered with a film to be tested was put on a glass plate also covered with a film of the same type. In that condition, the glass plate was inclined, and the angle, $\theta$, at which the slat on the glass plate began to slip was measured. The value of tan $\theta$ indicates the slip characteristics of the sample. A Toyo Seiki Seisakusho's friction angle meter was used in the test under the condition mentioned below.

Interface for measurement: metal-rolled surface/metal-rolled surface.

Inclination rate: 2.7 degrees/sec.

Weight of slat: 1 kg.

Cross section area of slat: 65 cm$^2$.

Pressure to interface: 15 g/cm$^2$.

<4> Transparency (haze):

Measured according to JIS K7105.

<5> Impact Resistance:

Of each film sample, the strength at fracture by shock was measured with a Toyo Seiki Seisakusho's film impact tester, for which was used a ½ inch impact head. This indicates the impact resistance of the film tested.

<6> Tensile Modulus:

Each film sample was subjected to a tensile test according to JIS K7127 under the condition mentioned below, and its tensile modulus was measured.

Cross head speed: 500 mm/min.

Load cell: 10 kg.

Direction: Machine direction (MD).

EXAMPLE I-1

(Preparation of magnesium compound)

A reactor (capacity: 80 liters) equipped with a stirrer was fully purged with nitrogen gas, and 20 liters of dewatered ethanol, 1.06 kg of metal magnesium and 106 g of iodine were put into it. With stirring, these were reacted under reflux until no hydrogen gas was given by the system. Thus was formed a solid reaction product. The reaction mixture containing the solid reaction product was dried under reduced pressure, and the intended magnesium compound (carrier for solid catalyst) was obtained.

(Preparation of solid catalyst component)

A reactor (capacity: 80 liters) equipped with a stirrer was purged with nitrogen gas, and 4.0 kg of the magnesium compound and 20 liters of dewatered heptane were put into it in that order. This was heated at 40° C., and 600 ml of silicon tetrachloride was added thereto, and stirred for 20 minutes. 850 ml of di-n-butyl phthalate was added thereto. This was heated up to 70° C., and 19.25 liters of titanium tetrachloride was added thereto. This was further heated up to 125° C., and subjected to contact reaction for 2 hours. Next, this was fully washed with dewatered heptane at 125° C. 30.50 liters of titanium tetrachloride was added to it, and further subjected to contact reaction at 125° C. for 2 hours. Next, this was fully washed with dewatered heptane at 125° C., and a solid component [A] was obtained.

(Prepolymerization)

A reactor (capacity: 80 liters) equipped with a stirrer was purged with nitrogen gas, and 1.0 kg of the solid component [A] and then 8.4 liters of dewatered heptane were put thereinto in that order. This was heated at 40° C., and 43 ml of triethylaluminium and 116 ml of dicyclopentyldimethoxysilane were added thereto. Propylene was introduced into the container under normal pressure and reacted for 2 hours. After this, the solid component was fully washed with dewatered heptane. Thus was prepared a catalyst component to be used herein.

(Polymerization)

The solid catalyst component prepared above was put into a polymerization reactor (capacity: 200 liters) equipped with a stirrer. Its amount was 3 mmols/kg-PP, in terms of Ti; 4 mmols/kg-PP, in terms of triethylaluminium; and 1 mmol/kg-PP, in terms of dicyclopentyldimethoxysilane. In the reactor, propylene and ethylene were reacted at a polymerization temperature of 80° C. and under a polymerization pressure (total pressure) of 28 kg/cm$^2$G. In this, the ethylene concentration was 2.5 mol %, and the hydrogen concentration was 5.0 mol %. As a result, obtained was a propylene-based random copolymer having an ethylene content of 2% by weight and MI of 7.1.

(Pelletization and sheeting)

The powder of the propylene-based random copolymer thus obtained was evaluated according to the above-mentioned methods for "resin evaluation". The data obtained are given in Table I-3. To the powder of the propylene-based random copolymer, added were the additives of formulation [A] mentioned above. The resulting mixture was pelletized through a Toshiba Kikai's extruder, Model 35B. The resulting, propylene-based random copolymer pellets were formed into films having a thickness of 30 μm, for which was used a Mitsubishi Heavy Industries' extruder (75 mmφ). The resin temperature at the outlet of the T-die was 265° C., the chill roll temperature was 25° C., and the take-up speed was 150 m/min. The films were evaluated according to the above-mentioned methods for "film quality evaluation". The data obtained are given in Table I-3.

In the following Tables, "Example I-1" is expressed simply as "Example 1", and the same shall apply to Example I-2 and others. Similarly, the same shall also apply to the Tables in the sections of the second, the third and the fourth aspects of the invention.

COMPARATIVE EXAMPLE I-1

The same process as in Example I-1 was repeated. In this, however, the contact reaction temperature in preparing the solid catalyst component was 110° C. but not 125° C., and the product for the solid catalyst component was washed with dewatered heptane at 80° C. but not at 125° C. The data obtained herein are given in Table I-3.

EXAMPLE I-2

The same process as in Example I-1 was repeated. In this, however, the ethylene concentration in the polymerization reactor was 5.0 mol %; the hydrogen concentration therein was 8.5 mol %; the additives of formulation [B] mentioned above were added to the copolymer powder; the copolymer pellets were formed into films having a thickness of 30 μm, for which was used a Mitsubishi Heavy Industries' extruder (75 mmφ); the resin temperature at the outlet of the T-die was 243° C.; the chill roll temperature was 40° C.; and the take-up speed was 125 m/min. The data obtained herein are given in Table I-3.

EXAMPLE I-3

The same process as in Example I-2 was repeated. In this, however, the ethylene concentration in the polymerization reactor was 7.5 mol %, and the hydrogen concentration therein was 12.2 mol %. The data obtained herein are given in Table I-3.

EXAMPLE I-2

The same process as in Example I-2 was repeated. In this, however, the contact reaction temperature in preparing the solid catalyst component was 110° C. but not 125° C., and the product for the solid catalyst component was washed with dewatered heptane at 80° C. but not at 125° C. The data obtained herein are given in Table I-3.

EXAMPLE I-4

The same process as in Example I-1 was repeated. In this, however, the ethylene concentration in the polymerization reactor was 2.7 mol %, and the stereospecificity index, P, of the copolymer was obtained according to the formula mentioned below. The data obtained herein are given in Table I-4.

$$P=I(11)/(I(11)+I(12)+I(13)-I(4)-I(5))\times 100.$$

This P indicates the isotactic fraction of triad units in the propylene chain region in the copolymer molecular chain. In this formula, the signal strength of the methyl carbon in the center propylene unit of PPE chains, which appears in the mr region, is substituted with the signal strength for Tβδ (fifth signal); and the signal strength of the methyl carbon in the propylene unit of EPE chains, which appears in the rr region, is substituted with the signal strength for Tδδ (fourth signal). For calculating P, employable is any of the method described in Example I-1 and the method described in this Example. In most cases, the two methods give substantially the same result. If not, or that is, if the two methods give different results, the method described in this Example is better than the other.

EXAMPLE I-5

The same process as in Example I-2 was repeated. In this, however, the ethylene concentration in the polymerization reactor was 5.3 mol %, and P was obtained according to the method described in Example I-4. The data obtained herein are given in Table I-4.

EXAMPLE I-6

The same process as in Example I-2 was repeated. In this, however, the ethylene concentration in the polymerization reactor was 7.9 mol %, and P was obtained according to the method described in Example I-4. The data obtained herein are given in Table I-4.

TABLE I-3

|  |  | Example 1 | Comp. Example 1 | Example 2 | Example 3 | Comp. Example 2 |
|---|---|---|---|---|---|---|
| Resin Properties | α (wt. %) | 2.0 | 2.1 | 4.0 | 6.0 | 4.1 |
|  | Wp (wt. %) | 79.1 | 75.5 | 53.1 | 31.8 | 39.9 |
|  | WO (wt. %) | 1.53 | 2.10 | 2.18 | 2.93 | 3.28 |

TABLE I-3-continued

|  |  | Example 1 | Comp. Example 1 | Example 2 | Example 3 | Comp. Example 2 |
|---|---|---|---|---|---|---|
|  | (3 + 2α)/4 | 1.75 | 1.80 | 2.75 | 3.75 | 2.80 |
|  | MI (g/10 min) | 7.1 | 7.1 | 7.4 | 7.5 | 7.6 |
|  | P (mol %) | 99.2 | 99.2 | 99.1 | 98.8 | 98.8 |
|  | Tm (° C.) | 146.4 | 147.5 | 133.5 | 120.5 | 135.9 |
|  | (160-5α) | 150.0 | 149.5 | 140.0 | 120.0 | 129.5 |
|  | WH (wt. %) | 1.0 | 0.6 | 7.3 | 1.9 | 2.0 |
|  | 3α | 6.0 | 6.3 | 12.0 | 18.0 | 12.3 |
|  | E (wt. %) | 0.9 | 1.0 | 1.4 | 1.9 | 2.0 |
|  | (2α + 15)/10 | 1.90 | 1.92 | 2.30 | 2.70 | 2.32 |
| Additives | Slip Agent (ppm) | 250 | 250 | 500 | 500 | 500 |
|  | Anti-blocking Agent (ppm) | 1000 | 1000 | 2300 | 2300 | 2300 |
| Film Properties | Heat-sealing Temperature (° C.) | 139 | 141 | 127 | 116 | 132 |
|  | Condition (1) (N/m$^2$) | 25 | 27 | 7 | 13 | 9 |
|  | Condition (2) (N/m$^2$) | 12 | 13 | 6 | 12 | 7 |
|  | Coefficient of Static Friction | 0.76 | 0.81 | 0.25 | 0.21 | 0.17 |
|  | Haze (%) | 2.2 | 2.1 | 4.3 | 4.0 | 4.4 |
|  | Fiim Impact (KJ/m) | 13 | 13 | 21 | not broken | 20 |
|  | Tensile Modulus (MPa) | 1020 | 980 | 850 | 600 | 840 |

TABLE I-4

|  |  | Example 4 | Example 5 | Example 6 |
|---|---|---|---|---|
| Resin Properties | α (wt.%) | 2.1 | 4.2 | 6.3 |
|  | Wp (wt. %) | 79.1 | 52.7 | 30.5 |
|  | WO (wt. %) | 1.54 | 2.23 | 2.88 |
|  | (3 + 2α)/4 | 1.80 | 2.85 | 3.90 |
|  | MI (g/10 min) | 6.9 | 6.8 | 6.6 |
|  | P (mol %) | 99.0 | 99.0 | 99.1 |
|  | Tm (° C.) | 145.9 | 133.1 | 119.3 |
|  | (160-5α) | 149.5 | 139.0 | 128.5 |
|  | WH (wt. %) | 1.1 | 7.5 | 14.9 |
|  | 3α | 6.3 | 12.6 | 18.9 |
|  | E (wt. %) | 0.9 | 1.4 | 2.1 |
|  | (2α + 15)/10 | 1.90 | 2.30 | 2.80 |
| Additives | Slip Agent (ppm) | 250 | 500 | 500 |
|  | Anti-blocking Agent (ppm) | 1000 | 2300 | 2300 |
| Film Properties | Heat-sealing Temperature (° C.) | 138 | 127 | 115 |
|  | Condition (1) (N/m$^2$) | 25 | 8 | 16 |
|  | Condition (2) (N/m$^2$) | 13 | 6 | 13 |
|  | Coefficient of Static Friction | 0.71 | 0.24 | 0.18 |
|  | Haze (%) | 2.1 | 4.1 | 3.8 |
|  | Film Impact (KJ/m) | 14 | 22 | not broken |
|  | Tensile Modulus (MPa) | 1000 | 850 | 590 |

Second Aspect of the Invention

[Resin evaluation]

(1) Measurement of Ethylene Unit Content, α (% by weight), and Stereospecificity Index, P (mol %), through $^{13}$C-NMR:

(a) Propylene-based, Propylene-ethylene Binary Random Copolymer:

The ethylene unit content, α (mol %), of the copolymer was obtained in the same manner as in the section of the first embodiment of the invention.

The stereospecificity index, P (mol %), of the copolymer was obtained according to the following formula:

Pr={I(11)/(I(11)+I(12)+I(13)−I(4)−I(5))}×100.

This Pr indicates the isotactic fraction of triad units in the propylene chain region in the copolymer molecular chain. In this formula, the signal strength of the methyl carbon in the center propylene unit of PPE chains, which appears in the mr region, is substituted with the signal strength for Tβδ (fifth signal); and the signal strength of the methyl carbon in the propylene unit of EPE chains, which appears in the rr region, is substituted with the signal strength for Tδδ (fourth signal).

(2) Temperature-programmed Fractionation Chromatography (TREF) for Wpr, WHr and W0r (% by weight):

The parameters were obtained in the same manner as in the section of the first aspect of the invention.

(3) Peak Top Temperature, Tcr (° C.), of Copolymer on the Highest Temperature Side in its Crystallization Curve Plotted in Differential Scanning Calorimetry (DSC), and Melting Point, Tmr (° C.), of Copolymer in DSC:

A differential scanning calorimeter (Parkin Elmer's DSC-7) was used. 10 mg of a sample was first melted in a nitrogen atmosphere at 230° C. for 3 minutes, and then cooled to 20° C. at a cooling rate of 10° C./min. In the exothermic curve indicating the crystallization profile of the sample, thus obtained, the peak top temperature, Tcr (° C.), on the highest temperature side was read. Next, the cooled sample was kept at that temperature 20° C. for 3 minutes, and then again heated at a heating rate of 10° C./min. In the endothermic curve indicating the melting profile of the sample, thus obtained, the temperature for the peak top of the highest peak was read. This is the melting point, Tmr (° C.), of the sample.

(4) Boiling Diethyl Ether Extract, Er (% by weight), of Copolymer:

Obtained in the same manner as in the section of the first aspect of the invention.

(5) Melt Index, MI (g/10 min):

Measured according to JIS K7210, at a temperature of 230° C. and under a load of 2160 g.

(6) Molecular Weight Distribution (Mw/Mn):

The weight-average molecular weight, Mw, and the number-average molecular weight, Mn, of each copolymer sample were measured through gel permeation chromatography under the condition mentioned below. The ratio, Mw/Mn indicates the molecular weight distribution of the sample.

Column: TOSO BMHHR-H' (S)HT.

Solvent: 1,2,4-trichlorobenzene.

Column temperature: 145° C.

Flow rate: 1.0 ml/min.

Calibration curve: Universal Calibration.

Detector: RI (WATERS 150C).

Program for analysis: HT-GPC (Ver. 1.0).

[Evaluation of copolymer composition]

(1) Peak Top Temperature, Tc (° C.), of Copolymer Composition on the Highest Temperature Side in its Crystallization Curve Plotted in Differential Scanning Calorimetry (DSC), and the Peak Top Temperature, Tm (° C.), on the Lowermost Temperature Side in its Melting Curve Plotted in DSC:

A differential scanning calorimeter (Parkin Elmer's DSC-7) was used. 10 mg of a sample was first melted in a nitrogen atmosphere at 230° C. for 3 minutes, and then cooled to 20° C. at a cooling rate of 10° C./min. In the exothermic curve indicating the crystallization profile of the sample, thus obtained, the peak top temperature, Tc (° C.), on the highest temperature side was read. Next, the cooled sample was kept at that temperature 20° C. for 3 minutes, and then again heated at a heating rate of 10° C./min. In the endothermic curve indicating the melting profile of the sample, thus obtained, the peak top temperature, Tm (° C.), on the lowest temperature side was read.

(2) Boiling Diethyl Ether Extract, E (% by weight), of Copolymer Composition:

Obtained in the same manner as in the section of "resin evaluation" mentioned above.

[Film quality evaluation]

Films were all annealed at 40° C. for 24 hours, and then conditioned at a temperature of 23±2° C. at a humidity of 50±10% for at least 16 hours. The properties of the thus-conditioned films were measured at the same temperature and at the same humidity.

(1) Heat-sealing Temperature:

Measured in the same manner as in the section of the first aspect of the invention.

(2) Anti-blocking Characteristics:

Two films were contacted with each other in such a manner that the metal-rolled surface of one film could face the surface of the other film opposite to its metal-rolled surface. Being thus contacted with each other, the films were fixed to a tool having a blocking test area of 10 cm×10 cm, and airtightly adhered to each other under the condition mentioned below. Then, these were peeled under the condition mentioned below to measure the peel strength of the blocked area of 10 cm×10 cm. The peel strength thus measured indicates the anti-blocking characteristics of the films tested.

Condition for adhesion:

Temperature: 50° C.

Period: 7 days.

Load: 15 g/cm².

Area: 10 cm×10 cm.

Condition for peel test:

Test speed: 20 mm/min.

Load cell: 2 kg (3) Slip Characteristics (coefficient of static friction):

Measured in the same manner as in the section of the first aspect of the invention.

(4) Transparency (haze):

Measured according to JIS K7105.

(5) Impact Resistance:

Of each film sample, the strength at fracture by shock was measured with a Toyo Seiki Seisakusho's film impact tester, for which was used a ½ inch impact head. This indicates the impact resistance of the film tested.

(6) Tensile Modulus:

Measured in the same manner as in the section of the first aspect of the invention.

Production of Propylene-based Random Copolymer

PRODUCTION EXAMPLE II-1

(Preparation of magnesium compound)

This is the same as in Example I-1.

(Preparation of solid catalyst component)

This is the same as in Example I-1.

(Prepolymerization)

This is the same as in Example I-1.

(Polymerization)

The solid catalyst component prepared above was put into a polymerization reactor (capacity: 200 liters) equipped with a stirrer. Its amount was 3 mmols/kg(polymer), in terms of Ti; 4 mmols/kg(polymer), in terms of triethylaluminium; and 1 mmol/kg(polymer), in terms of dicyclopentyldimethoxysilane. In the reactor, propylene and ethylene were reacted at a polymerization temperature of 80° C. and under a polymerization pressure (total pressure) of 28 kg/cm²G. In this stage, the ethylene flow rate was so controlled that the copolymer to be produced could have a predetermined ethylene content, and hydrogen serving as a molecular weight-controlling agent was fed into the system. The hydrogen flow rate was so controlled that the copolymer could have a predetermined molecular weight. The vapor composition in the polymerization reactor was analyzed through gas chromatography. In the reactor, the ethylene concentration was 5.0 mol %, and the hydrogen concentration was 8.5 mol %. The powder of the propylene-based random copolymer thus obtained was evaluated according to the above-mentioned methods for "resin evaluation". The data obtained are given in Table II-1.

TABLE II-1

| | | Production Example 1 |
|---|---|---|
| Tcr | ° C. | 80.4 |
| Tmr | ° C. | 120.5 |
| γ | wt. % | 6.0 |
| Wpr | wt. % | 31.8 |
| WOr | wt. % | 2.93 |
| $(3 + 2\gamma)/4$ | | 3.75 |
| $160 - 5\gamma$ | | 130.0 |
| WHr | wt. % | 1.9 |
| 3γ | wt. % | 18.0 |
| Er | wt. % | 1.9 |
| $(2\gamma + 15)/10$ | | 2.70 |
| MI | g/10 min | 7.5 |
| P | mol % | 98.8 |
| Mw/Mn | | 3.3 |

EXAMPLE II-1

To 100 parts by weight of the propylene-based random copolymer that had been prepared in Production Example II-1, added were 0.1 parts by weight of bis(2,4,8,10-tetra-t-butyl-6-hydroxy-12H-dibenzo[d,g][1,3,2]dioxophosphosin-6-oxide) ammoniumn hydroxide (Asahi Denka's Adekastab NA-21) serving as a nucleating agent, 0.1 parts by weight of Irganox 1010 (from Ciba Speciality Chemicals) and 0.1 parts by weight of Irgafos 168 (from Ciba Speciality Chemicals) both serving as an antioxidant, 0.23 parts by weight of a silica compound (from Fuji Silicia) serving as an anti-blocking agent, 0.1 parts by weight of calcium stearate serving as a neutralizing agent, and 0.05 parts by weight of erucamide serving as a lubricant. The resulting mixture was pelletized through a Toshiba Kikai's extruder, Model 35B. The pellets were evaluated according to the methods of "evaluation of copolymer composition" mentioned above. The data obtained are given in Table II-2.

The propylene-based random copolymer pellets were formed into films having a thickness of 30 μm, for which was used a Mitsubishi Heavy Industries' extruder (75 mmφ). The resin temperature at the outlet of the T-die was 243° C., the chill roll temperature was 40° C., and the take-up speed was 125 m/min.

The films were evaluated according to the above-mentioned methods for "film quality evaluation". The data obtained are given in Table II-2.

REFERENCE EXAMPLE II-1

The same process as in Example II-1 was repeated. In this, however, the nucleating agent was not added to the copolymer. The copolymer pellets were formed into films, but the films could not be well released from the chill roll at their edges in the machine direction. The appearances of the films formed were not good.

Some data of the copolymer composition are given in Table II-2.

TABLE II-2

| | | | Example 1 | Ref. Example 1 |
|---|---|---|---|---|
| Evaluation of Composition | Tc | ° C. | 93.0 | 80.4 |
| | Tm | ° C. | 113.7 | 120.5 |
| | 0.75Tm-5 | ° C. | 80.3 | 85.4 |
| | WO | wt. % | 2.9 | 2.9 |
| Film Properties | Haze | % | 4.5 | |
| | Impact Resistance | KJ/m | 19 | |
| | Slip Characteristics (coefficient of static friction) | | 0.21 | |
| | Anti-blocking Characteristics | N/m$^2$ | 15 | |
| | Tensile Modulus, MD | MPa | 630 | |
| | Heat-sealing Temperature | ° C. | 116 | |
| | Sealing Temperature | 110° C. | 109 | |
| | Sealing Temperature | 115° C. | 215 | |
| | Sealing Temperature | 120° C. | 745 | |
| | Sealing Temperature | 125° C. | 1132 | |
| | Sealing Temperature | 130° C. | 1980 | |
| | Sealing Temperature | 135° C. | 1881 | |

Third Aspect of the Invention

[Resin evaluation]

<1> Measurement of Ethylene Unit Content, α (% by weight), and Stereospecificity Index, P (mol %), through $^{13}$C-NMR:

(a) Propylene-based, Propylene-ethylene Binary Random Copolymer:

The ethylene unit content, α (mol %), of the copolymer was obtained in the same manner as in the section of the first embodiment of the invention.

The stereospecificity index, Pr (mol %), of the copolymer was obtained according to the following formula:

$$Pr=\{I(11)/(I(11)+I(12)+I(13)-I(2)-I(4))\}\times 100.$$

This Pr indicates the isotactic fraction of triad units in the propylene chain region in the copolymer molecular chain. In this formula, the signal strength of the methyl carbon in the center propylene unit of PPE chains, which appears in the mr region, is substituted with the signal strength for Sαγ (second signal); and the signal strength of the methyl carbon in the propylene unit of EPE chains, which appears in the rr region, is substituted with the signal strength for Tδ67 (fourth signal).

<2> Temperature-programmed Fractionation Chromatography (TREF):

This is the same as in the section of the first aspect of the invention.

<3> Melting point, Tm (° C.), and Differential Quantity of Heat, ΔHB (J/g), of Copolymer Measured through Differential Scanning Calorimetry (DSC); and Crystallization Temperature, Tc (° C.), and Melting Point, Tm (° C.), of Resin Composition Measured through DSC:

A differential scanning calorimeter (Parkin Elmer's DSC-7) was used. 10 mg of a copolymer sample was first melted in a nitrogen atmosphere at 230° C. for 3 minutes, and then cooled to 20° C. at a cooling rate of 10° C./min. The cooled sample was kept at that temperature 20° C. for 3 minutes, and then again heated at a heating rate of 10° C./min. In the endothermic curve indicating the melting profile of the sample, thus obtained, the temperature for the peak top of the highest peak was read. This is the melting point of the sample. In the same manner, a propylene-based resin composition sample was subjected to DSC. In the crystallization curve obtained, the peak top temperature on the highest temperature side was read, and this is the crystallization temperature, Tc (° C.), of the sample. In the endothermic curve indicating the melting profile of the sample, also obtained, the peak top temperature on the lowest temperature side was read, and this is the melting point, Tm (° C.) of the sample. The quantity of heat of fusion at the melting point is the differential quantity of heat, ΔHB, of the sample.

<4> Boiling Diethyl Ether Extract, E (% by weight), of Copolymer:

Obtained in the same manner as in the section of the first aspect of the invention.

<5> Melt Index, MI (g/10 min):

Measured according to JIS K7210, at a temperature of 230° C. and under a load of 2160 g.

<6> Molecular Weight Distribution (Mw/Mn):

Obtained in the same manner as in the section of the second aspect of the invention.

[Film quality evaluation]

Films were all annealed at 40° C. for 24 hours, and then conditioned at a temperature of 23±2° C. at a humidity of 50±10% for at least 16 hours. The properties of the thus-conditioned films were measured at the same temperature and at the same humidity.

<1> Heat-sealing Temperature:

Measured in the same manner as in the section of the first aspect of the invention.

<2> Anti-blocking Characteristics:

Measured in the same manner as in the section of the second aspect of the invention.

<3> Slip Characteristics:

Measured in the same manner as in the section of the first aspect of the invention.

<4> Transparency (haze):
Measured according to JIS K7105.

<5> Impact Resistance:
Of each film sample, the strength at fracture by shock was measured with a Toyo Seiki Seisakusho's film impact tester, for which was used a ½ inch impact head. This indicates the impact resistance of the film tested.

<6> Tensile Modulus:
Measured in the same manner as in the section of the first aspect of the invention.

[Production of propylene-based polymer]

(1) Propylene-ethylene Random Copolymer (A-1):
(Preparation of magnesium compound)
This is the same as in Example I-1.
(Preparation of solid catalyst component)
This is the same as in Example I-1.
(Prepolymerization)
This is the same as in Example I-1.
(Polymerization)

The solid catalyst component prepared above was put into a polymerization reactor (capacity: 200 liters) equipped with a stirrer. Its amount was 3 mmols/kg-PP, in terms of Ti; 4 mmols/kg-PP, in terms of triethylaluminium; and 1 mmol/kg-PP, in terms of dicyclopentyldimethoxysilane. In the reactor, propylene and ethylene were reacted at a polymerization temperature of 80° C. and under a polymerization pressure (total pressure) of 28 kg/cm$^2$G. In this stage, the ethylene flow rate was so controlled that the copolymer to be produced could have a predetermined ethylene content, and hydrogen serving as a molecular weight-controlling agent was fed into the system. The hydrogen flow rate was so controlled that the copolymer could have a predetermined molecular weight. The vapor composition in the polymerization reactor was analyzed through gas chromatography. In the reactor, the ethylene concentration was 7.5 mol %, and the hydrogen concentration was 12.2 mol %.

The resin characteristics of the polymer obtained were measured, and shown in Table III-1.

(2) Propylene-ethylene Random Copolymer (A-2):
This was produced in the same manner as in the process of producing the copolymer (A-1). For this, however, the monomers were polymerized under the condition mentioned below, and its stereospecificity index, Pr, was calculated according to the formula mentioned below.

The solid catalyst component prepared above was put into a polymerization reactor (capacity: 200 liters) equipped with a stirrer. Its amount was 3 mmols/kg-PP, in terms of Ti; 4 mmols/kg-PP, in terms of triethylaluminium; and 1 mmol/kg-PP, in terms of dicyclopentyldimethoxysilane. In the reactor, propylene and ethylene were reacted at a polymerization temperature of 80° C. and under a polymerization pressure (total pressure) of 28 kg/cm$^2$G. In this stage, the ethylene flow rate was so controlled that the copolymer to be produced could have a predetermined ethylene content, and hydrogen serving as a molecular weight-controlling agent was fed into the system. The hydrogen flow rate was so controlled that the copolymer could have a predetermined molecular weight. The vapor composition in the polymerization reactor was analyzed through gas chromatography. In the reactor, the ethylene concentration was 7.9 mol %, and the hydrogen concentration was 12.2 mol %.

The resin characteristics of the polymer obtained were measured, and shown in Table III-1.

The stereospecificity index, Pr, of the copolymer was calculated according to the following formula:

$$Pr=\{I(11)/(I(11)+I(12)+I(13)-I(4)-I(5))\}\times 100.$$

For example, I(1) indicates the signal strength of the signal number (1) in Table I-1.

This Pr indicates the isotactic fraction of triad units in the propylene chain region in the copolymer molecular chain. In this formula, the signal strength of the methyl carbon in the center propylene unit of PPE chains, which appears in the mr region, is substituted with the signal strength for Tβδ (fifth signal); and the signal strength of the methyl carbon in the propylene unit of EPE chains, which appears in the rr region, is substituted with the signal strength for Tδδ (fourth signal). For calculating Pr of propylene-ethylene random copolymers, employable is any of the method described in the section of "Resin evaluation, <1>-(a)" as above, concretely the method for (A-1), and the method described in this Example. In most cases, the two methods give substantially the same result. If not, or that is, if the two methods give different results, the method described in this Example is better than the other.

(5) Propylene-based Polymer (B-1):
This was produced in the same manner as in the process of producing the copolymer (A-1), except for the condition for monomer polymerization. The monomer polymerization to produce this is as follows:

a polymerization reactor (capacity: 200 liters) equipped with a stirrer. Its amount was 3 mmols/kg-PP, in terms of Ti; and 4 mmols/kg-PP, in terms of triethylaluminium. In this stage, dicyclopentyldimethoxysilane was not added to the polymerization system. In the reactor, propylene was homopolymerized at a polymerization temperature of 80° C. and under a polymerization pressure (total pressure) of 28 kg/cm$^2$G. Hydrogen serving as a molecular weight-controlling agent was fed into the system. The hydrogen flow rate was so controlled that the polymer to be produced could have a predetermined molecular weight. The vapor composition in the polymerization reactor was analyzed through gas chromatography. In the reactor, the hydrogen concentration was 4.4 mol %. The polymer produced had a melt index of 5.8 g/10 min, as measured according to JIS K7210.

The resin characteristics of the polymer produced were measured, and shown in Table III-1.

TABLE III-1

|     |         | A-1   | A-2   |         |      | B-1   |
|-----|---------|-------|-------|---------|------|-------|
| TcA | ° C.    | 80.4  | 80.0  | TcB     | ° C. | 116.3 |
| Tmr | ° C.    | 120.5 | 119.3 | TmB     | ° C. | 164.7 |
| α   | wt. %   | 6.0   | 6.3   | ΔHB     | J/g  | 117   |
| Wpr | wt. %   | 31.8  | 30.5  | TmB/2 + 10 |   | 92    |
| Whr | wt. %   | 1.9   | 14.9  |         |      |       |
| WOr | wt. %   | 2.93  | 2.88  |         |      |       |
| Er  | wt. %   | 1.9   | 2.1   |         |      |       |
| Mlr | g/10 min| 7.5   | 6.6   |         |      |       |
| Pr  | mol %   | 98.8  | 99.1  |         |      |       |
| Mw/Mn |       | 3.3   | 3.8   |         |      |       |

EXAMPLE III-1

(1) Propylene-based Resin Composition:

To a resin composition comprised of 90 parts by weight of the propylene-based random copolymer (A-1) and 10 parts by weight of the propylene polymer (B-1), added were the following additives. The resulting mixture was kneaded and granulated, using a Toshiba Kikails extruder, Model 35B.

<1> Antioxidant:
Ciba Speciality Chemicals' Irganox 1010: 1000 ppm
Ciba Speciality Chemicals' Irgafos 168: 1000 ppm
<2> Neutralizing Agent:
Calcium stearate: 1000 ppm
<3> Anti-blocking Agent:
Fuji Silicia's silica-type anti-blocking agent: 2300 ppm
<4> Slip Agent:
Erucamide: 500 ppm (2) Film Formation:

Pellets of the propylene-based resin composition thus prepared in the manner as above were formed into films having a thickness of 30 μm, for which was used a Mitsubishi Heavy Industries' extruder (75 mmφ). The resin temperature at the outlet of the T-die was 243° C., the chill roll temperature was 40° C., and the take-up speed was 150 m/min.

The blend ratio of the resin composition, the resin characteristics, and the film properties are given in Table III-2.

COMPARATIVE EXAMPLE III-1

The same process as in Example III-1 was repeated, except that the propylene polymer (B-1) was not added to the copolymer. The copolymer pellets were formed into films, but the films could not be well released from the chill roll at their edges in the machine direction. The appearances of the films formed were not good.

The blend ratio of the resin composition, the resin characteristics, and the film properties are given in Table III-2.

EXAMPLE III-2

The same process as in Example III-1 was repeated, except that the propylene-based binary random copolymer (A-2) was used in place of the propylene-based random copolymer (A-1). The blend ratio of the resin composition, the resin characteristics, and the film properties are given in Table III-2.

COMPARATIVE EXAMPLE III-2

The same process as in Example III-2 was repeated, except that the propylene polymer (B-1) was not added to the copolymer. The copolymer pellets were formed into films, but the films could not be well released from the chill roll at their edges in the machine direction. The appearances of the films formed were not good.

The blend ratio of the resin composition, the resin characteristics, and the film properties are given in Table III-2.

TABLE III-2

| | | | Example 1 | Comp. Example 1 | Example 2 | Comp. Example 2 |
|---|---|---|---|---|---|---|
| Blend Ratio | A-1 | wt. pts. | 90 | 100 | 0 | 0 |
| | A-2 | wt. pts. | 0 | 0 | 90 | 100 |
| | B-1 | wt. pts. | 10 | 0 | 10 | 0 |
| Crystallization | TcA | ° C. | 80.4 | 80.4 | 80.0 | 80.0 |
| Temperature | TcB | ° C. | 116.3 | — | 116.3 | — |
| Resin Composition | Tc | ° C. | 96.3 | 80.4 | 95.9 | 90.0 |
| | Tm | ° C. | 107.1 | 120.5 | 106.9 | 119.3 |
| | 0.75Tm-5 | | 75.3 | 85.4 | 75.2 | 84.5 |
| | W0 | wt. % | 2.68 | 2.93 | 2.63 | 2.88 |
| Film Heat-Sealing Temperature | | ° C. | 116 | Good films not obtained. | 116 | Good films not obtained. |
| Anti-blocking Characteristics | | N/m² | 12 | | 13 | |
| tan θ | | | 0.22 | | 0.21 | |
| Haze | | % | 4.5 | | 4.3 | |
| Film Impact | | KJ/m | 18 | | 19 | |
| Tensile Modulus | | MPa | 630 | | 610 | |

Fourth Aspect of the Invention

[Resin evaluation]

<1> Measurement of Ethylene Unit Content, γ (% by weight), and Stereospecificity Index, P (mol %), through $^{13}$C-NMR:

(a) Propylene-based, Propylene-ethylene Binary Random Copolymer:

The ethylene unit content, γ, of the copolymer was obtained in the same manner as in the section of the first embodiment of the invention.

The stereospecificity index, P (mol %), of the copolymer was obtained according to the following formula:

$$P = \{I(11)/(I(11)+I(12)+I(13)-I(4)-I(5))\} \times 100.$$

This P indicates the isotactic fraction of triad units in the propylene chain region in the copolymer molecular chain. In this formula, the signal strength of the methyl carbon in the center propylene unit of PPE chains, which appears in the mr region, is substituted with the signal strength for Tβδ (fifth signal); and the signal strength of the methyl carbon in the propylene unit of EPE chains, which appears in the rr region, is substituted with the signal strength for Tδδ (fourth signal).

<2> Temperature-programmed Fractionation Chromatography (TREF):

A sample solution was introduced into the TREF column controlled at 135° C., then gradually cooled therein to 0° C. at a cooling rate of 5° C./hr, whereby the sample was adsorbed by the filler. Next, the column was heated up to 135° C. at a heating rate of 40° C./hr, and the elution pattern curve of the sample was obtained. W0, Wp and WH of the sample were derived from the pattern curve.

The apparatus used, and the condition for measurement are the same as in the section of the first aspect of the invention.

<3> Melting Point, Tm (° C.), of Copolymer Measured through Differential Scanning Calorimetry (DSC):

A differential scanning calorimeter (Parkin Elmer's DSC-7) was used. 10 mg of a copolymer sample was first melted in a nitrogen atmosphere at 230° C. for 3 minutes, and then cooled to 20° C. at a cooling rate of 10° C./min. The cooled sample was kept at that temperature 20° C. for 3 minutes, and then again heated at a heating rate of 10° C./min. In the endothermic curve indicating the melting profile of the sample, thus obtained, the temperature for the peak top of the highest peak was read. This is the melting point of the sample.

<4> Boiling Diethyl Ether Extract, E (% by weight), of Copolymer:

Obtained in the same manner as in the section of the first aspect of the invention.

<5> Melt Index, MI (g/10 min):

Measured according to JIS K7210, at a temperature of 230° C. and under a load of 2160 g.

<6> Molecular Weight Distribution (Mw/Mn):

Obtained in the same manner as in the section of the second aspect of the invention.

[Laminate evaluation]

Laminates were all annealed at 40° C. for 24 hours, and then conditioned at a temperature of 23±2° C. at a humidity of 50±10% for at least 16 hours. The properties of the thus-conditioned laminates were measured at the same temperature and at the same humidity.

<1> Anti-blocking Characteristics:

Condition 1:

Two laminates were contacted with each other in such a manner that the surface (that is, the surface of the heat seal layer) of one laminate opposite to its metal-rolled surface could face the surface (that is, the surface of the heat seal layer) of the other laminate opposite to its metal-rolled surface. Being thus contacted with each other, the laminates were fixed to a tool having a blocking test area of 10 cm×10 cm, and airtightly adhered to each other under the condition mentioned below. Then, these were peeled under the condition mentioned below to measure the peel strength (unit: $N/m^2$) of the blocked area of 10 cm×10 cm. The peel strength thus measured indicates the anti-blocking characteristics of the films tested. Laminates having a smaller peel strength have better anti-blocking characteristics.

Condition for Adhesion:

Temperature: 50° C.

Period: 7 days.

Load: 15 g/cm².

Area: 10 cm×10 cm.

Condition for Peel Test:

Test speed: 20 mm/min.

Load cell: 2 kg

Condition 2:

This is the same as Condition 1, except that the laminates were contacted with each other in such a manner that the surface (that is, the surface of the heat seal layer) of one laminate opposite to its metal-rolled surface could face the metal-rolled surface (that is, the surface of the laminate layer) of the other laminate.

<2> Heat-sealing Temperature:

Measured in the same manner as in the section of the first aspect of the invention.

<3> Transparency (haze):

Measured according to JIS K7105.

<4> Tensile Modulus:

Each laminate sample was subjected to a tensile test according to JIS K7127 under the condition mentioned below, and its tensile modulus was measured.

Cross head speed: 500 mm/min.

Load cell: 10 kg.

Direction: Machine direction (MD).

EXAMPLE IV-1

(Preparation of magnesium compound)

This is the same as in Example I-1.

(Preparation of solid catalyst component)

This is the same as in Example I-1.

(Prepolymerization)

This is the same as in Example I-1.

(Polymerization)

The solid catalyst component prepared above was put into a polymerization reactor (capacity: 200 liters) equipped with a stirrer. Its amount was 3 mmols/kg-PP, in terms of Ti; 4 mmols/kg-PP, in terms of triethylaluminium; and 1 mmol/kg-PP, in terms of dicyclopentyldimethoxysilane. In the reactor, propylene and ethylene were reacted at a polymerization temperature of 80° C. and under a polymerization pressure (total pressure) of 28 kg/cm²G. In this stage, the ethylene flow rate was so controlled that the copolymer to be produced could have a predetermined ethylene content, and hydrogen serving as a molecular weight-controlling agent was fed into the system. The hydrogen flow rate was so controlled that the copolymer could have a predetermined molecular weight. The vapor composition in the polymerization reactor was analyzed through gas chromatography. In the reactor, the ethylene concentration was 7.5 mol %, and the hydrogen concentration was 12.2 mol %. In that manner, prepared was a propylene-based, binary random copolymer [A-1].

(Pelletization and sheeting)

The powder of the propylene-based random copolymer thus obtained was evaluated according to the above-mentioned methods for "resin evaluation". The data obtained are given in Table IV-1. To the powder of the propylene-based random copolymer, added were the additives mentioned below. The resulting mixture was pelletized through a Toshiba Kikai's extruder, Model 35B.

<1> Antioxidant:

Ciba Speciality Chemicals' Irganox 1010: 1000 ppm

Ciba Speciality Chemicals' Irgafos 168: 1000 ppm

<2> Neutralizing Agent:

Calcium stearate: 1000 ppm

<3> Anti-blocking Agent:

Fuji Silicia's silica-type anti-blocking agent: 2300 ppm

<4> Slip Agent:

Erucamide: 500 ppm (Laminate formation)

A multi-layered laminate-forming machine having a feed block-type T-die was used. This was equipped with a T-die (from Koshin Engineering), a feed block member (from Tawaraya Tekkojo), an extruder EX40 Model (from Placo) (No. 1), an extruder VS30-26 Model (from Tanabe Plastic Kikai) (No. 2), and two extruders RT-3-30 Model (from Rikua) (No. 3 and No. 4). The resin extruded through the No. 2 extruder was divided into two layers. The laminate produced had a 4-type, 5-layered resin constitution of No. 1/No. 2/No. 4/No. 2/No. 3, in that order from the side opposite to the first chill roll surface. In Example IV-1 of the invention, pellets of the propylene-based random copolymer [A-1] were extruded through the extruder No. 1; pellets of Idemitsu Polypro F-724NP were through the extruders No. 2 and No. 4; and pellets of Idemitsu Polypro F-704NP were through the extruder No. 3. The laminate had a layer thickness ratio of propylene-based random copolymer [A-1] layer/F-724NP layer/F-704NP layer=1/3/1, and had an overall thickness of 30 μm. The resin temperature at the feed block member and at the outlet of the T-die was 230° C.; the chill roll temperature was 30° C.; and the take-up speed was 25 m/min.

The laminates produced were evaluated according to the methods of "laminate evaluation" as above. The data obtained are given in Table IV-2.

EXAMPLE IV-2

The same process as in Example IV-1 was repeated. In this, however, pellets of Idemitsu Polypro F-704NP but not F-724NP were extruded through the extruders No. 2 and No. 4. The multi-layered laminate thus produced herein had a layer constitution of propylene-based random copolymer [A-1] layer/F-704NP layer=1/4 (thickness ratio).

The data obtained are given in Table IV-2.

COMPARATIVE EXAMPLE IV-1

The same process as in Example IV-1 was repeated. In this, however, pellets of Idemitsu Polypro F-744NP was used in place of the propylene-based random copolymer [A-1].

The data obtained are given in Table IV-1 and Table IV-2.

TABLE IV-1

| | Items | | [A-1] | F-744NP |
|---|---|---|---|---|
| Gas | Hydrogen | (mol %) | 12.2 | — |
| Concentration | Ethylene | (mol %) | 7.5 | — |
| Resin | Ethylene Content ($\gamma$) | (wt. %) | 6.0 | 4.0 |
| Properties | $(3 + 2\gamma)/4$ | | 3.75 | 2.75 |
| | $160 - 5\gamma$ | | 130 | 140 |
| | $(2\gamma + 15)/10$ | | 2.7 | 2.3 |
| | $90 - 12\gamma$ | | 18 | 42 |
| | Wp | (wt. %) | 31.8 | 39.9 |
| | W0 | (wt. %) | 2.93 | 3.28 |
| | WH | (wt. %) | 1.9 | 2.0 |
| | Boiling Diethyl Ether Extract | (wt. %) | 1.9 | 2.0 |
| | MI | (g/10 min) | 7.5 | 7.6 |
| | Stereo-specificity Index | | 98.8 | 98.8 |
| | Mw/Mn | | 3.3 | 4.2 |
| | Tm | (° C.) | 120.5 | 135.9 |

TABLE IV-2

| | Ex. 1 | Ex. 2 | Comp. Ex. 1 |
|---|---|---|---|
| Heat Seal Layer | A-1 | A-1 | F-744NP |
| Interlayer | F-724NP | F-704NP | F-724NP |
| Laminate Layer | F-704NP | F-704NP | F-704NP |
| Haze (%) | 4.7 | 5.6 | 4.9 |
| Anti-blocking Properties Condition 1 N/m² | 22 | 23 | 19 |
| Anti-blocking Properties Condition 2 N/m² | 10 | 10 | 8 |
| Tensile Modulus MPa | 880 | 1060 | 890 |
| Heat-sealing Temperature ° C. | 115 | 119 | 127 |

INDUSTRIAL APPLICABILITY

As described hereinabove, the invention provides polypropylene films that exhibit excellent heat-sealability not interfering with the favorable characteristics (including good toughness, transparency, moisture-proofness, etc.) intrinsic to ordinary polypropylene films. The films have good slip characteristics and anti-blocking characteristics that are needed in high-speed working lines for forming them into bags, and even in such high-speed working lines, the quality of the films is lowered little. The moldability into the films and also the properties of the films are improved.

What is claimed is:

1. A propylene-ethylene random copolymer satisfying the following:

its ethylene unit content, $\alpha$, as measured through $^{13}$C-NMR, falls between 0.2 and 10% by weight;

the amount of its fraction, Wp, eluted within the temperature range between (Tp−5)° C. and (Tp+5)° C. in temperature-programmed fractionation chromatography is at least 20% by weight, with Tp (° C.) being the peak temperature for essential elution;

the amount of its fraction, W0, % by weight, eluted within the temperature range not higher than 0° C. in temperature-programmed fractionation chromatography, and $\alpha$ satisfy the relationship therebetween given by the following formula (I-1):

$$W0 \leq (3+2\alpha)/4 \tag{I-1}$$

2. The propylene random copolymer as claimed in claim 1, of which the melting point, Tm (° C.), as measured through differential scanning calorimetry (DSC), and a satisfy the relationship therebetween given by the following formula (I-2):

$$Tm \leq 160 - 5\alpha \tag{I-2}$$

3. The propylene random copolymer as claimed in claim 1, of which the amount of the fraction, WH, % by weight, eluted within the temperature range not lower than (Tp+5)° C. in temperature-programmed fractionation chromatography, with Tp (° C.) being the peak temperature for essential elution, and a satisfy the relationship therebetween given by the following formula (I-3):

$$0.1 \leq WH \leq 3\alpha \tag{I-3}$$

4. The propylene random copolymer as claimed in claim 1, of which the amount of the fraction, E, % by weight, extracted with boiling diethyl ether is at most 2.5% by weight, and E and $\alpha$ satisfy the relationship therebetween given by the following formula (I-4):

$$E \leq (2\alpha+15)/10 \tag{I-4}$$

5. The propylene random copolymer as claimed in claim 1, of which the melt index, MI, falls between 0.1 and 200 g/10 min.

6. The propylene random copolymer as claimed in claim 1, of which the stereospecificity index, P, as measured through $^{13}$C-NMR, is at least 98 mol %.

7. The propylene random copolymer as claimed in claim 1, of which $\alpha$ falls between 3 and 7% by weight.

8. A film of the propylene random copolymer of claim 1.

9. A propylene random copolymer composition comprising (i) a propylene-ethylene random copolymer and (ii) a nucleating agent, of which the peak top temperature, Tc (° C.), on the highest temperature side in its crystallization curve plotted in differential scanning calorimetry (DSC), and the peak top temperature, Tm (° C.), on the lowermost temperature side in its melting curve plotted in DSC satisfy the following formula (II-1):

$$Tc \geq 0.75 \times Tm - 5 \tag{II-1},$$

and the amount of the fraction, W0, % by weight, eluted within the temperature range not higher than 0° C. in temperature-programmed fractionation chromatography is at most 6% by weight.

10. A propylene random copolymer composition comprising (i) a propylene-ethylene random copolymer and (ii) a nucleating agent, wherein the copolymer (i) satisfies the following conditions:

its ethylene unit content, $\gamma$, as measured through $^{13}$C-NMR, falls between 0.2 and 10% by weight;

the amount of its fraction, Wpr, eluted within the temperature range between (Tpr−5)° C. and (Tpr+5)° C. in temperature-programmed fractionation chromatography is at least 20% by weight, with Tpr (° C.) being the peak temperature for essential elution;

the amount of its fraction, W0r, % by weight, eluted within the temperature range not higher than 0° C. in temperature-programmed fractionation chromatography, and γ satisfy the relationship therebetween given by the following formula (II-2):

$$W0r \leq (3+2\gamma)/4 \tag{II-2}$$

11. The propylene random copolymer composition as claimed in claim 9, wherein the amount of the nucleating agent is from 0.001 to 5 parts by weight relative to 100 parts by weight of the propylene-ethylene random copolymer.

12. The propylene random copolymer composition as claimed in claim 9, wherein the propylene-ethylene random copolymer has a melt index, MI of from 0.1 to 200 g/10 min.

13. The propylene random copolymer composition as claimed in claim 9, wherein the propylene-ethylene random copolymer has a stereospecificity index, P, as measured through $^{13}$C-NMR, of at least 98 mol %.

14. A film of the propylene random copolymer composition of claim 9.

15. A multi-layered film, of which at least one layer is of the propylene random copolymer composition of claim 9.

16. A propylene resin composition comprising (A) from 55 to 99 parts by weight of a propylene-ethylene random copolymer and (B) from 1 to 45 parts by weight of a propylene polymer of which the crystallization temperature $T_{CB}$ (° C.), as measured through differential scanning calorimetry, is higher than the crystallization temperature $T_{CA}$ (° C.) of the component (A) measured through the same; the composition being such that its peak top temperature, Tc (° C.), on the highest temperature side in its crystallization curve plotted in differential scanning calorimetry, and the peak top temperature, Tm (° C.), on the lowermost temperature side in its melting curve plotted in the same satisfy the relationship therebetween given by the following formula (III-1):

$$Tc \geq 0.75 \times Tm - 5 \tag{III-1},$$

and that the amount of its fraction, W0, eluted within the temperature range not higher than 0° C. in temperature-programmed fractionation chromatography (TREF) is at most 6% by weight.

17. The propylene resin composition as claimed in claim 16, wherein the propylene-ethylene random copolymer of the component (A) is such that the amount of its fraction, Wp, % by weight, eluted within the temperature range between (Tp−5)° C. and (Tp+5)° C. in temperature-programmed fractionation chromatography (TREF) with Tp being the peak temperature for essential elution, satisfies the following formula (III-2):

$$20 \leq Wp \leq 65 \tag{III-2}$$

18. The propylene resin composition as claimed in claim 16, wherein the crystallization temperature $T_{CB}$ (° C.) of the component (B), as measured through differential scanning calorimetry, is higher by at least 10° C. than the crystallization temperature $T_{CA}$ (° C.) of the component (A) measured through the same.

19. The propylene resin composition as claimed in claim 16, wherein the propylene-ethylene random copolymer of the component (A) copolymer satisfies the following:

its ethylene unit content, α, as measured through $^{13}$C-NMR, falls between 0.2 and 10% by weight;

the amount of its fraction, Wpr, eluted within the temperature range between (Tpr−5)° C. and (Tpr+5)° C. in temperature-programmed fractionation chromatography (TREF) is at least 20% by weight, with Tpr (° C.) being the peak temperature for essential elution; and the amount of its fraction, W0r (% by weight), eluted within the temperature range not higher than 0° C. in temperature-programmed fractionation chromatography (TREF), and α (% by weight) satisfy the relationship therebetween given by the following formula (III-3):

$$W0r \leq (3+2\alpha)/4 \tag{III-3}$$

20. The propylene resin composition as claimed in claim 16, wherein the component (B) satisfies the relationship given by the following formula (III-4) between its differential quantity of heat, $\Delta H_B$ (J/g), and its melting point, $Tm_B$ (° C.), on its melting curve plotted through differential scanning calorimetry:

$$\Delta H_B \geq Tm_B/2 + 10 \tag{III-4}$$

21. A film of the propylene resin composition of claim 16.

22. A multi-layered, propylene resin laminate, of which at least one outermost layer comprises the following propylene polymer A:

a propylene-ethylene random copolymer satisfying the following:

its ethylene unit content, γ, as measured through $^{13}$C-NMR, falls between 0.2 and 10% by weight;

the amount of its fraction, Wp, eluted within the temperature range between (Tp−5)° C. and (Tp+5)° C. in temperature-programmed fractionation chromatography is at least 20% by weight, with Tp (° C.) being the peak temperature for essential elution;

the amount of its fraction, W0, % by weight, eluted within the temperature range not higher than 0° C. in temperature-programmed fractionation chromatography, and γ satisfy the relationship therebetween given by the following formula (A1):

$$W0 \leq (3+2\gamma)/4 \tag{A1}$$

23. The multi-layered, propylene resin laminate as claimed in claim 22, wherein the propylene polymer A further satisfies the following condition:

that its melting point, Tm (° C.), as measured through differential scanning calorimetry (DSC), and γ satisfy the relationship therebetween given by the following formula (A2):

$$Tm \leq 160 - 5\gamma \tag{A2}$$

24. The multi-layered, propylene resin laminate as claimed in claim 22, wherein the propylene polymer A further satisfies the following condition:

that the amount of its fraction, WH, % by weight, eluted within the temperature range not lower than (Tp+5)° C. in temperature-programmed fractionation chromatography, with Tp (° C.) being the peak temperature for essential elution, and γ satisfy the relationship therebetween given by the following formula (A3):

$$0.1 \leq WH \leq 3\gamma \tag{A3}$$

25. The multi-layered, propylene resin laminate as claimed in claim 22, wherein the propylene polymer A further satisfies the following condition:

that the amount of its fraction, E, extracted with boiling diethyl ether is at most 2.5% by weight, and that E and γ satisfy the relationship therebetween given by the following formula (A4):

$$E \leq (2\gamma+15)/10 \tag{A4}$$

26. The multi-layered, propylene resin laminate as claimed in claim 22, wherein γ of the propylene polymer A falls between 3 and 7% by weight.

27. The multi-layered, propylene resin laminate as claimed in claim 22, wherein the melt index, MI, of the propylene polymer A falls between 0.1 and 200 g/10 min.

28. The multi-layered, propylene resin laminate as claimed in claim 22, wherein the stereospecificity index, P, of the propylene polymer A, as measured through $^{13}$C-NMR, is at least 98 mol %.

29. The multi-layered, propylene resin laminate as claimed in claim 22, wherein the weight-average molecular weight, Mw, and the number-average molecular weight, Mn, of the propylene polymer A, as measured through gel permeation chromatography (GPC), are in a ratio, Mw/Mn, falling between 2 and 6.

30. The multi-layered, propylene resin laminate as claimed in claim 22, of which the tensile modulus, TM (MPa), and the heat-sealing temperature, HST (° C.), satisfy the following relationship therebetween:

$$TM \geq 40 \times HST - 4000 (HST \geq 115),$$

and $$TM \geq 600 (HST < 115).$$

31. The multi-layered, propylene resin laminate as claimed in claim 22, wherein at least one outermost layer comprises the propylene polymer A and is laminated with at least one or more other layers each comprising the propylene polymer A that differs in the ethylene content from that in the outermost layer.

32. The multi-layered, propylene resin laminate as claimed in claim 22, which is produced in a T-die casting method.

* * * * *